(12) United States Patent
Picker et al.

(10) Patent No.: US 9,756,650 B2
(45) Date of Patent: *Sep. 5, 2017

(54) METHODS FOR SUPPORTING MULTIPLE OPERATORS IN A WIRELESS BASESTATION

(71) Applicant: REDLINE COMMUNICATIONS INC., Markham (CA)

(72) Inventors: Dan Picker, San Diego, CA (US); Ronen Vengosh, Menlo Park, CA (US); Rephael Cohen, Sunnyvale, CA (US)

(73) Assignee: Redline Communications Inc., Markham (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/746,975

(22) Filed: Jun. 23, 2015

(65) Prior Publication Data

US 2015/0289284 A1 Oct. 8, 2015

Related U.S. Application Data

(60) Continuation of application No. 13/890,676, filed on May 9, 2013, now Pat. No. 9,094,953, which is a division of application No. 13/235,562, filed on Sep. 19, 2011, now Pat. No. 8,494,587.

(51) Int. Cl.
| | |
|---|---|
| *H04W 72/12* | (2009.01) |
| *H04W 88/10* | (2009.01) |
| *H04W 72/04* | (2009.01) |
| *H04W 72/00* | (2009.01) |
| *H04L 5/00* | (2006.01) |

(52) U.S. Cl.
CPC .......... *H04W 72/1215* (2013.01); *H04L 5/00* (2013.01); *H04W 72/04* (2013.01); *H04W 88/10* (2013.01); *H04W 72/00* (2013.01)

(58) Field of Classification Search
CPC . H04W 88/10; H04W 72/00; H04W 72/1215; H04W 72/04
USPC .............. 455/450, 434, 452.1, 452.2, 552.1; 370/329
See application file for complete search history.

(56) References Cited

U.S. PATENT DOCUMENTS

| | | | |
|---|---|---|---|
| 4,989,230 | A | 1/1991 | Gillig |
| 5,021,801 | A | 6/1991 | Smith |
| 5,535,259 | A | 7/1996 | Dent |
| 5,784,442 | A | 7/1998 | Foti |
| 5,913,177 | A | 6/1999 | Meredith |
| 6,101,176 | A | 8/2000 | Honkasalo |

(Continued)

FOREIGN PATENT DOCUMENTS

WO   WO 2010/111839 A1   10/2010

*Primary Examiner* — Inder Mehra
(74) *Attorney, Agent, or Firm* — Rosenberg, Klein & Lee

(57) ABSTRACT

Methods for a wireless Base Station (BS) capable of simultaneously providing service to subscribers of multiple Operators. Depending upon the particular deployment requirements or equipment capabilities, each Operator may be operating on the same or different frequencies (in which different frequencies may be adjacent, closely separated, or widely separated). The wireless BS will distinguish and logically separate and route the traffic between each subscriber device and its relevant Operator's Core Network, potentially supporting different logical or even different physical interfaces between the wireless BS and each Operator.

3 Claims, 27 Drawing Sheets

(56) References Cited

U.S. PATENT DOCUMENTS

| | | |
|---|---|---|
| 6,151,310 A | 11/2000 | Dent |
| 6,405,048 B1 | 6/2002 | Haartsen |
| 6,901,257 B2 | 5/2005 | Kubota |
| 7,233,782 B2 | 6/2007 | Bao |
| 7,590,092 B2 | 9/2009 | Milton |
| 7,590,422 B1 | 9/2009 | Chow |
| 7,881,722 B2 | 2/2011 | Gunnarsson |
| 7,986,971 B2 | 7/2011 | Anckar |
| 8,126,496 B2 | 2/2012 | Brisebois |
| 8,311,005 B2 | 11/2012 | Sundaresan |
| 2002/0083195 A1 * | 6/2002 | Beshai ............... H04L 12/5692 709/238 |
| 2002/0102976 A1 | 8/2002 | Newbury |
| 2003/0109257 A1 | 6/2003 | Nilsson |
| 2003/0171124 A1 | 9/2003 | Kataoka |
| 2004/0233883 A1 | 11/2004 | Ludwig |
| 2005/0070288 A1 | 3/2005 | Belkin |
| 2006/0234777 A1 | 10/2006 | Vannithamby |
| 2006/0270411 A1 | 11/2006 | Grayson |
| 2007/0008929 A1 | 1/2007 | Lee |
| 2007/0178839 A1 | 8/2007 | Rezvani |
| 2007/0238460 A1 | 10/2007 | Yamen |
| 2007/0259664 A1 | 11/2007 | Blakstad Poolsaar |
| 2008/0305801 A1 | 12/2008 | Burgess |
| 2009/0040972 A1 | 2/2009 | Robson |
| 2009/0047931 A1 | 2/2009 | Nanda |
| 2009/0059854 A1 | 3/2009 | Nishio |
| 2009/0161617 A1 | 6/2009 | Abedi |
| 2009/0170472 A1 | 7/2009 | Chapin |
| 2010/0130212 A1 | 5/2010 | So |
| 2010/0167728 A1 | 7/2010 | Venkitaraman |
| 2010/0203921 A1 | 8/2010 | Hannu |
| 2011/0044176 A1 | 2/2011 | Li |
| 2011/0105132 A1 | 5/2011 | Vasudevan |
| 2011/0286401 A1 | 11/2011 | Wijting |
| 2012/0039226 A1 | 2/2012 | Yang |
| 2012/0046057 A1 | 2/2012 | Pesola |
| 2012/0052793 A1 | 3/2012 | Brisebois |
| 2012/0082100 A1 | 4/2012 | Ahmadi |
| 2012/0093098 A1 | 4/2012 | Charbit |
| 2012/0207133 A1 | 8/2012 | Wong |
| 2012/0309397 A1 | 12/2012 | Rao |

* cited by examiner

METHODS FOR SUPPORTING MULTIPLE OPERATORS IN A WIRELESS BASESTATION

CROSS-REFERENCE TO RELATED APPLICATIONS

This application is a continuation of and claims priority to U.S. application Ser. No. 13/890,676, filed May 9, 2013, now allowed, which is a divisional of U.S. application Ser. No. 13/235,562, filed Sep. 19, 2011, now issued as U.S. Pat. No. 8,494,587, each of which is hereby incorporated by reference herein in its entirety.

BACKGROUND

The recent advent of so-called "smart phones" and the demand they bring for ever-increasing network capacity is now complicating the traditional problem of simply providing reliable and ubiquitous wireless coverage for primary voice and data services. In the prior art, several solutions have been deployed to deal with the problem of increasing infrastructure, but none of these solutions are wholly satisfactory.

One natural solution to this problem, employed in the prior art, is to add additional Base Stations. Base Station architectures have traditionally been dominated by what is known as a "macro" approach, characterized by large racks of electronics enclosed in large structures, connected to antennas and sometimes to electronics on top of high towers. With this approach, a "Base Station" is actually a collection of pieces of hardware acting as individual Base Stations and contained within the same large structure. In the macro approach, adding additional carriers or bands to the pre-existing Base Station can be as simple as adding additional individual Base Stations within the structure. This is often accompanied by a reduction in the coverage of each Base Station in order to minimize inter-station interference and increase spectral re-use.

However, there are problems with the addition of Base Stations. There are significant capital and operational costs associated with each additional unit of equipment installed. Moreover, regardless of cost, the macro approach is not suitable for situations in which the density of Base Stations in a structure is already high, or in which Base Station cells have been greatly reduced in order to minimize inter-station interference and increase spectral re-use. In such cases of high infrastructure density, or small-cell coverage, the additional of large structures besides huge towers is simply impractical and will not meet public, municipal, or functional requirements.

A second solution to the problem of increasing infrastructure, employed in the prior art, is to mount Base Station equipment or repeater equipment on utility poles, traffic light polls, small buildings, and the like, instead of adding such equipment at an increasingly burdened central location. The mounting requirements of such equipment usually dictate that the equipment be more compact—both smaller and lighter—then ordinary Base Station or repeater equipment that is typically placed in a large structure. Furthermore, mounted equipment tends to be more integrated, and more weather resistant, than traditionally Base Station or repeater equipment.

Unfortunately problems exist with this second solution. Municipalities and the general public are not always tolerant or accepting of wireless equipment in public view. The public placement of such equipment has increased over time, and will simply become more prolific as the equipment and installation sites multiply. There are also the added costs of manufacturing, transporting, mounting, and maintaining such equipment. Also, space limitations at desirable sites are such that it may not be possible, at any cost, to mount Base Station or repeater equipment at desirable or nearby locations.

The solution to these problems is a practical way for the various Operators to collaborate and share infrastructure equipment.

BRIEF SUMMARY

One embodiment is a wireless Base Station (BS) system designed to allow multiple Operators to share system resources. In such a system, the wireless BS communicates with multiple Core Network data sources on one side and with multiple Radio Access Networks (RAN) on the other side. Such a system may include a network processor that maintains at least two network Tunnels extending directly to at least two corresponding Core Network data sources, at least one Baseband Processor that creates at least two RANs substantially simultaneously, and at least one radio transceiver chain to accommodate the at least one Baseband Processor in creating the at least two RANs. In one embodiment of such a system, the system splits dynamically a pool of pre-allocated wireless Access Spectrum between the at least two RAN according to a criterion, reconfigures the at least one Baseband Processor to maintain the at least two RANs according to the recent split, and operates the at least two RANs using data communicated with the corresponding at least two Core Network data sources via the corresponding at least two network Tunnels.

One embodiment is a method for dynamically generating a plurality of Radio Access Networks (RAN) by a single wireless Base Station (BS). In one particular form of such embodiment, there is determined first and second amounts of wireless Access Spectrum needed by a wireless BS to wirelessly convey data from a first and a second corresponding Core Network data sources. These first and second amounts of wireless Access Spectrum are then allocated, out of a pool of pre-allocated wireless Access Spectrum belonging to a the wireless BS, to first and second RANs, respectively. The wireless BS then communicates first and second data sets to the first and second Core Network data sources, respectively. The wireless BS then conveys, over the first and second RANs respectively, the first and second data sets to a first and second set of wireless Subscriber Stations (SS).

One embodiment is a method for servicing multiple Operators via a single wireless Base Station (BS) utilizing dynamic allocation of spectrum. In one particular form of such embodiment, the wireless BS communicates first and second data set to a first Core Network data source belonging to a first Operator and a second Core Network data source belonging to a second Operator, respectively, over first and second network Tunnels, respectively. The wireless BS then conveys, to a first and a second sets of wireless Subscriber Stations (SS), the first and the second data sets respectively, over first and second RANs respectively, utilizing a first amount and a second amount of wireless Access Spectrum, respectively. A determination is then made that the first amount of wireless Access Spectrum is not sufficient to convey the first data set. The first amount of wireless Access Spectrum is then increased at the expense of the second amount of wireless Access Spectrum, thereby making the first amount of wireless Access Spectrum better suited to convey the first data set.

BRIEF DESCRIPTION OF THE DRAWINGS

Embodiments of the present invention are herein described, by way of example only, with reference to the accompanying drawings. With specific reference now to the drawings, it is stressed that the particulars shown are by way of example and for purposes of illustrative discussion of embodiments of the present invention only, and are presented in order to provide what is believed to be the most useful and readily understood description of the principles and conceptual aspects of embodiments of the present invention. In this regard, no attempt is made to show structural details of embodiments in more detail than is necessary for a fundamental understanding of the invention. In the drawings.

DETAILED DESCRIPTION

Figure 1A:
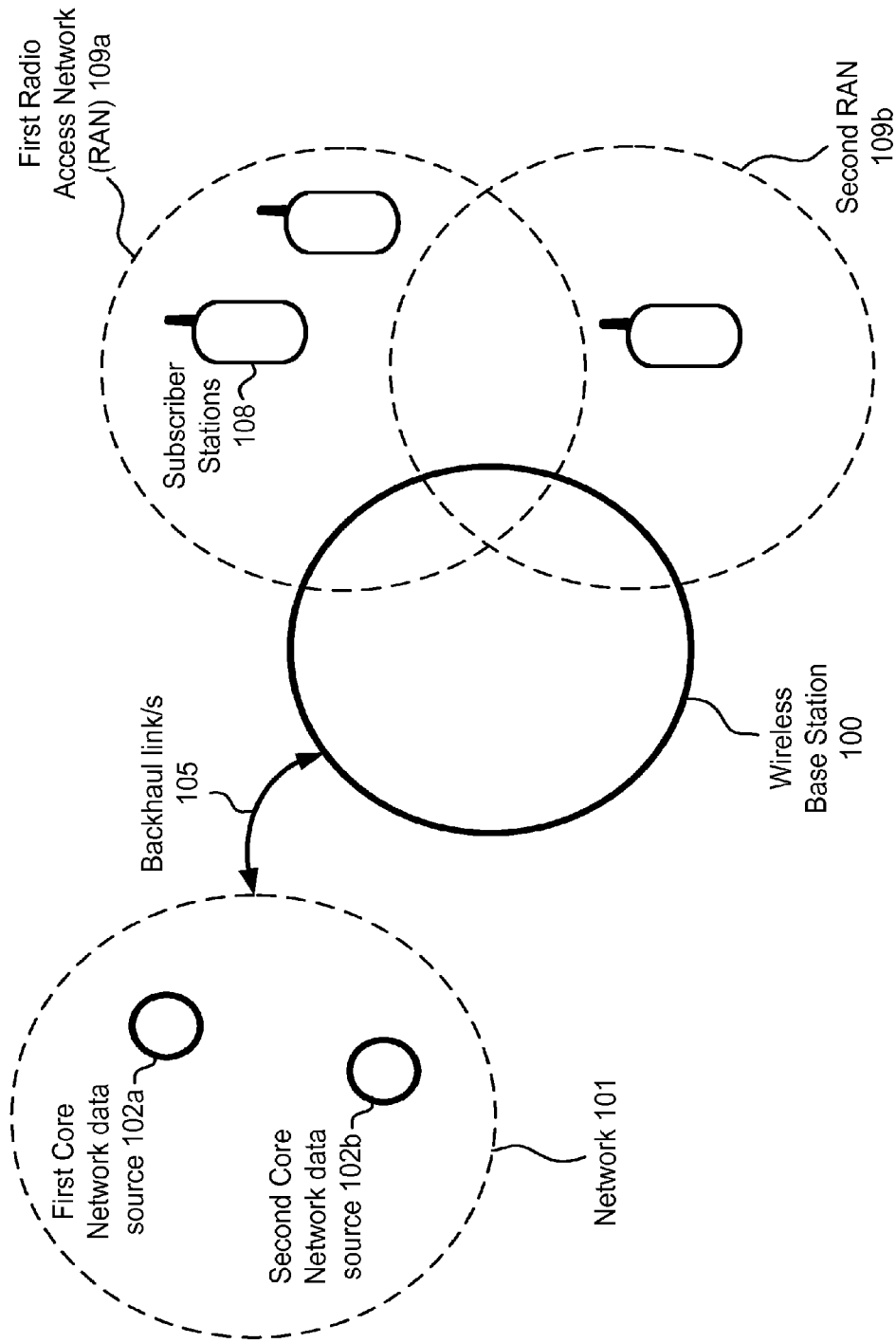
FIG. 1A illustrates one embodiment of components comprising a system of a wireless Base Station (BS) communicating with multiple Radio Access Networks (RANs)

A number of terms are used in the presentation of embodiments, among which are the following:

An "Analog-Digital Interface", also called a "Two-Way Analog-Digital Interface", is a converter between two components of a system that converts analog signals to digital signals, or digital signals to analog signals, depending on the need. One example of an Analog-Digital Interface is an interface between a Baseband subsystem and radio transceiver chain. Each of the components listed may have additional sub-components, some of which are listed in the embodiments described herein. Different configurations of the components are described in some of the embodiments. Different communication paths and processes between components are described in some of the embodiments. The components, sub-components, configurations, and communication paths and processes, presented herein, are intended to present only some of the embodiments, and are illustrative only.

A "wireless Base Station", or "Base Station", is a collection of hardware and software that communicates to Subscriber Stations over the RAN, using any of a variety of standardized or proprietary protocols, in TDD or FDD mode, and on one or more channels of wireless Access Spectrum. If a Base Station can operate on multiple radio channels of spectrum that are considered to be relatively closely separated from each other (or even adjacent to one another), the Base Station is referred to as a "multi-carrier Base Station". If a multi-carrier Base Station can operate on widely separated frequencies then it may additionally be referred to as a "multi-band Base Station". A "multi-mode Base Station" is a Base Station that supports multiple wireless protocols. Non-limiting examples of such wireless protocols include LTE and WiFi. The wireless Base Station generates the RAN.

By industry convention, and also herein, "Base Station" includes not just the hardware processing device in which radio processing and baseband processing occurs, but also the radio transceiver chain connected to such hardware processing device, and the antennas in physical connection with the radio transceiver chain. In some embodiments, each such hardware processing device is connected to one radio transceiver chain, and each radio transceiver chain is connected to one antenna. However, it is possible to have multiple antennas connected to one radio transceiver chain. It is also possible to have one antenna in connection with multiple radio transceiver chains, in which case there would be a power combiner that combines the signals from the radio transceiver chains into the one antenna. It is also possible to split one radio transceiver chain to multiple hardware processing devices, so that the multiple hardware devices feed signals to the radio transceiver chain. It is also possible to have one hardware processing device connected to multiple radio transceiver chains. All of the possible configurations discussed herein come within the term "Base Station".

A "Baseband Processor" (BP) is a device, typically a chip or a part of a chip in a Base Station, that manages and performs signal processing and radio control functions. Modulation and demodulation of communication signals are typically performed by a BP. A BP is a component of a wireless Base Station, and also typically appears in advanced consumer wireless equipment, although the configuration of the BP device will vary depending on many factors, including, among others, whether it will function in the wireless BS or in the consumer wireless device.

A "Core Network" is a part of a mobile communication network that provides various services to Subscriber Stations who are connected to the Core Network via a RAN. An Operator's Core Network is the aggregation point of data to and from multiple Base Stations, and typically includes equipment and software for subscriber authentication, monitoring, metering, billing, control, and overall administration of the network. A Base Station communicates to the Core Network over the Base Station's "backhaul interface", which may be either wired or wireless.

A "Gateway device" is a device through which passes all traffic to and from a set of Base Stations. Most Operators organize their networks with one or more Gateway devices, although strictly speaking, this is not essential. Communication between a Base Station and a Gateway is generally governed by a standard or proprietary protocol, and will usually vary to some degree among Operators, even when all the Operators are using a technical standards-based approach. This protocol, whether standard for multiple Operators or proprietary to one Operator, is almost always carried "in-band". "In-band" means that the communication protocol between a Base Station and a Gateway is logically multiplexed with the data itself on the Base Station's backhaul interface.

Some Base Stations also communicate directly with one another, rather than through a Gateway. One typical reason for such communication is to exchange time-sensitive information related to inter-Base Station subscriber handover operations. Another typical reason for such communication is to help implement or improve load-balancing between Base Stations. Inter-Base Station communication, for whatever reason it is implemented, is typically governed by standard or proprietary protocols, and such protocols, even if standard, will usually vary among Operators and even among manufacturers of infrastructure equipment.

A "network Tunnel" or "Tunnel" is a network communications channel between two networks. It is used to transport another network protocol by encapsulation of the protocol packets. Tunnels are often used for connecting two disjoint networks that lack a native routing path to each other, via an underlying routable protocol across an intermediate transport network. In IP tunneling, every IP packet, including addressing information of its source and destination IP networks, is encapsulated within another packet format native to the transit network. At the borders between the source network and the transit network, as well as the transit network and the destination network, Gateways are used that establish the end-points of the IP tunnel across the transit network. IP Tunnels are logical, rather than physical, interfaces. Examples of network Tunnels are IP Tunnels and Generic Routing Encapsulation (GRE).

An "Operator" is a company or other entity that provides wireless services to subscribers. An Operator may operate regionally, nation-wide, or even globally. An Operator may utilize either Licensed or Unlicensed spectrum, or a combination of both. Each portion of an Operator's spectrum may be deployed as half-duplex, time division duplex (TDD), full-duplex, or frequency division duplex (FDD). An Operator's spectral allocation may be uniform across its service area, or may vary from region to region. If multiple Operators function in different and non-overlapping geographic regions, the same frequency range may be allocated to different Operators in different regions.

A "Radio Access Network" (RAN) is a part of a mobile communication system that implements radio access technology. In a wireless communication system, the RAN sits between the Subscriber Station and the Core Network. The RAN is generated by the wireless BS.

"Roaming" is a situation where a Subscriber Station assigned to a particular Operator, encounters a wireless network belong to a different Operator, where frequency encountered by the Subscriber Station is supported by the different Operator, and the Subscriber Station receives service from that different Operator.

"Subscriber Stations" are wireless communication devices used by customers of an Operator. Such Subscriber Stations are typically, but not necessarily and not always, locked to all or a subset of the radio frequencies licensed to that Operator. Some possible non-limiting categories of Subscriber Stations include handsets, dongles, customer premises equipment (CPE) for wireless communication, and hot spot equipment for wireless communication. Non-limiting examples of handsets include cellular telephones of all kinds, PDAs, wireless data devices, pages, and other consumer radio equipment.

"Wireless Access Spectrum" is the radio spectrum on which a RAN operates, and hence the radio spectrum is utilised by both Subscriber Stations to access the wireless Base Station and the wireless Base Station to communicate with Subscriber Stations.

There is a need for a practical way by which various Operators may collaborate and share infrastructure equipment and other resources. The sharing of resources by multiple Operators can be advantageous to all parties. Devices, systems, and methods are presented herein for a wireless Base Station (BS) capable of substantially simultaneously providing service to subscribers of multiple Operators. Depending upon the particular deployment requirements or equipment capabilities, each Operator may be operating on the same or different frequencies. If frequencies are different, they may be adjacent, closely separated, or widely separated. The wireless BS will distinguish and logically separate and route the traffic between each Subscriber Station and the Core Network providing service to that Subscriber Station. The wireless BS may support different logical or different physical interfaces between the wireless BS and each Operator.

Where limited wireless or processing resources are shared among the Operators, load balancing techniques and methods may be deployed to govern the allocation of these resources. Non-limiting examples of shared resources include Subscriber Stations of multiple Operators sharing the same frequency, Operators sharing one or more radio chains, shared antennas, shared transmit power, shared backhaul, and one or more processors which process communication for multiple Operators. For these and other cases of shared resource utilization, load balancing techniques and methods may apply within a single Base Station, or among a group of Base Stations on a network. Such load balancing techniques and methods may be distributed, or controlled centrally, or have dynamically shifting control as the needs change. Considerations in the selection and deployment of load balancing techniques may be technical or financial or both. Such considerations may affect the load balancing algorithms and decisions. As an example of a consideration that is both technical and financial, one Operator may be heavily loaded at a particular time while another Operator may be lightly loaded at the same time. By agreement between the Operators, the heavily loaded Operator may off-load capacity by utilizing resources normally allocated to the lightly loaded Operator. An agreement like this would typically include financial compensation from the heavily loaded Operator to the lightly loaded Operator, and such compensation may be cost per usage, fixed cost per period or by event, variable cost depending on such factors as time and relative loading, or on any other basis agreed upon by the Operators.

Many possible embodiments of a multi-Operator BS may be imagined. A very few non-limiting examples include the following:

(1) According to one multi-Operator BS scenario, at least Subscriber Devices of one Operator in the geographic region of interest may not have the capability to roam onto another Operator's licensed spectrum. This could be because such Subscriber Devices of a first Operator do not contain the appropriate frequency support to function on the frequency of the second Operator, or because such Subscriber Devices are locked onto the first Operator's network, or because such Subscriber Devices are locked out of the other Operator's network.

In one embodiment, this problem may be handled by either a multi-carrier or multi-band Base Station, with one or more distinct carriers allocated to each Operator. The relative amounts of spectrum allocated among the Operators could impact the allocation of carriers among the Operators. In this embodiment, the Base Station may support multiple logical core-network interfaces, one for each Operator, and the interfaces may be either standardized or customized for each different Operator. Communication may be multiplexed onto the same physical backhaul interface, with each message or even each packet labeled with unique routing information to connect the message or packet to its corresponding core network gateway. However, and alternatively, each logical interface may utilise different physical interfaces.

In this embodiment, load balancing of shared Base Station resources between Operators may apply to any or all of antennas, transmit power, backhaul resources, and processing power.

(2) According to a second multi-Operator BS scenario, at least some subscriber devices of a first Operator in the geographic region of interest do have the capability to roam onto another Operator's licensed spectrum.

For this case, in one embodiment such roaming may be handled by either a multi-carrier or a multi-band Base Station, depending at least in part upon the specific spectrum allocations to the Operators. A Subscriber Station may, by default, connect to its own Operator's spectrum, in which case communication will be effected as explained in scenario (1) above. However, in the event that the Operator's network is heavily loaded, prior art architecture does not allow the Base Station to direct the subscriber to a more lightly loaded Operator's spectrum. In one embodiment, instead of the typical prior art roaming situation, by which a local Operator's network handles the session and later bills the subscriber's Operator per pre-agreement, the Base Station will support multiple logical Core Network interfaces, one such interface for each Operator, and the traffic from the redirected subscriber will be routed to its own Operator's core interface. (Such interface may be logical or physical, or dynamically shifting between logical and physical.) The Base Station, in combination with relevant Core Network elements, can keep track of this shared usage so that the proper financial compensation may be made between Operators.

In this embodiment, load balancing of shared Base Station resources between Operators may apply to spectrum, antennas, transmit power, backhaul resources, processing power, or any of the other elements previously identified as possible shared resources.

(3) According to a third multi-Operator BS scenario, the Base Station and at least some Subscriber Stations in a geographic region of interest, support one or more ranges of unlicensed spectrum or protocols. Various non-limiting examples of an unlicensed protocol are Bluetooth, WiFi, and WiMAX, but there are many such examples of technologies. Often, but not exclusively, such technologies may operate at relatively low power, or may operate in one of the non-licensed bands such as 915 MHz, 2.45 Gz, or 5.8 GHz. This third scenario can occur in combination with either scenario (1) or scenario (2), above.

In one embodiment of a scenario with unlicensed spectrum or protocols, usage on unlicensed spectrum is handled by either a multi-carrier Base Station or multi-band Base Station (depending upon the specific spectrum allocations of the Operators). If multiple protocols are involved, in which a second Operator employs a protocol not used by a first Operator, a multi-mode Base Station may support the different protocols.

In this third scenario of unlicensed spectrum or protocols, licensed operation is handled as in the case of either scenarios (1) or (2) above. At the same time, unlicensed spectrum may be budgeted or simply shared among the participating Operators, or the unlicensed spectrum may be used as a resource that is allocated and charged for by the owner of the Base Station. The owner of the Base Station may be one of the Operators, or may be a separate party. In any event, traffic allocated to unlicensed spectrum supported by a Base Station will again be routed to and from the Operator's Core Network. Such routing may be logical or physical or dynamically changing between logical and physical.

The general architecture for some of the embodiments described herein call for a number of components, including: (1) Subscriber Stations, (2) RANs, (3) antenna and radio chains, the latter including power amplifiers, low noise amplifiers, and one or more transceivers. Each radio chain may operate on the same channel (single-carrier capability), different but closely separated channels (multi-carrier capability), or widely separated channels (multi-band capability), (4) a Baseband subsystem, (5) a network processor that may implement, among other things, an array of logical core network interfaces, each of which multiplex into one or more physical backhaul interfaces, (6) backhaul links, and (7) core Networks.

Each of the components listed may have additional sub-components, some of which are listed in the embodiments described herein. Different configurations of the components are described in some of the embodiments. Different communication paths and processes between components are described in some of the embodiments. The components, sub-components, configurations, and communication paths and processes, presented herein, are intended to present only some of the embodiments, and are illustrative only.

FIG. 1A illustrates one embodiment of components in a system. In FIG. 1A, there is a wireless Base Station (BS) 100, which is connected by one or more Backhaul links 105 to an IP Network 101. Said IP Network includes two or more sources of data. Here, the sources are data that come from a first Core Network, First Core Network data source 102a, and from a second Core Network, Second Core Network data source 102b. The wireless BS 100 also generates two or more Random Access Networks (RANs), here First RAN 109a and Second RAN 109b. Each RAN network communicates with one or more Subscriber Stations. In FIG. 1A, Subscriber Stations 108 are communicatively connected to First RAN 109a.

Figure 1B:
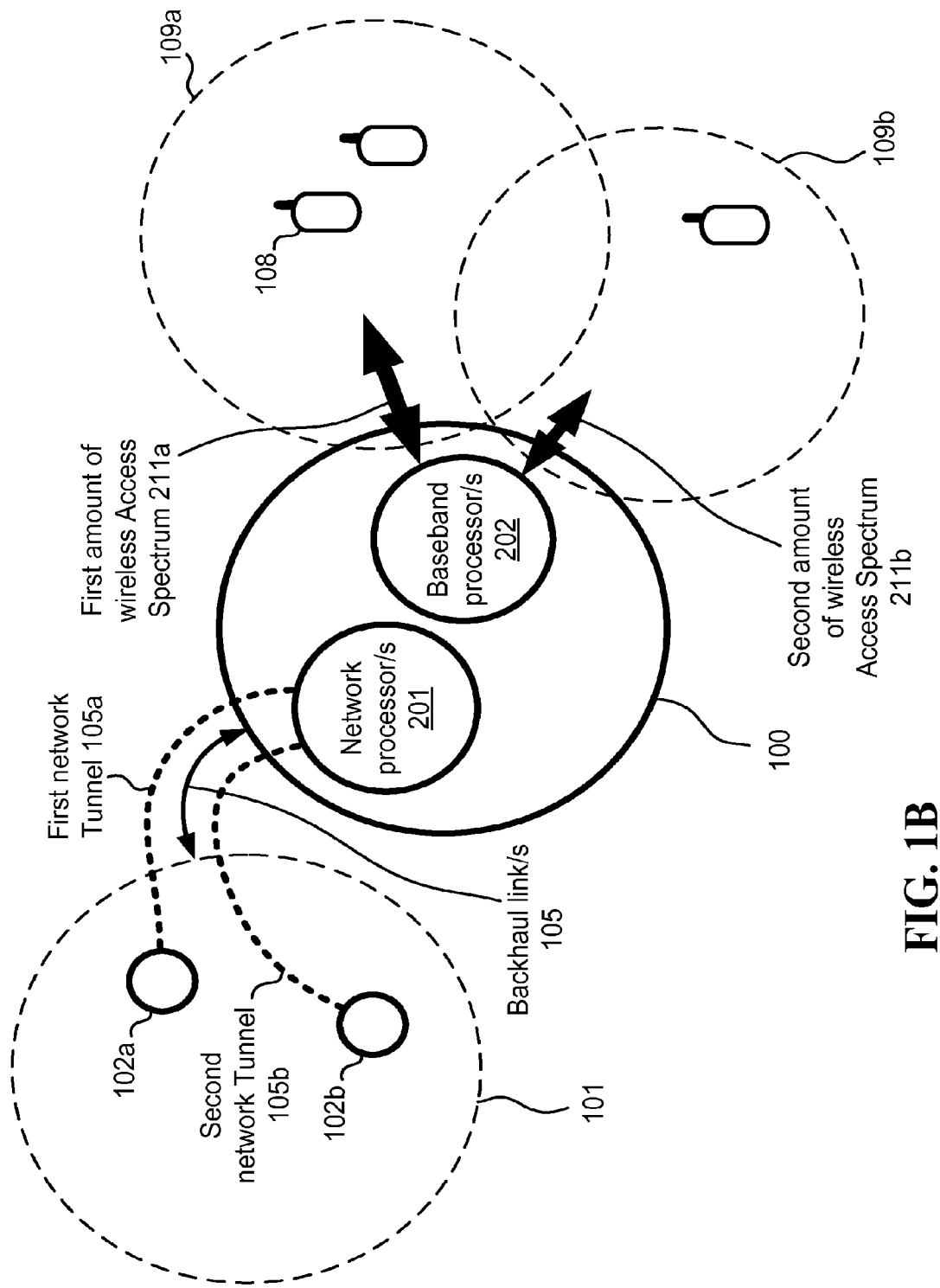
FIG. 1B illustrates one embodiment of components comprising a system of a wireless Base Station (BS) communicating with multiple Radio Access Networks (RANs), in which there is illustrated the allocation of spectrum to the RANs, components of wireless BS, and communication paths between the wireless BS and the Core Networks.

FIG. 1B illustrates one embodiment of components in a system. The wireless BS 100 includes at least two major components, which are one or more Network processors 201 that communicate with IP Network 101 via the physical Backhaul links 105. The Backhaul links 105 are physical links, which may be microwave, cable, or any other communication medium. Backhaul links 105 provide a path for the logical links, which are the network Tunnels connecting Core Network data sources with the Network processors 102. In FIG. 1B, First network Tunnel 105a communicatively connects First Core Network data source 102a with Network processors 201, and Second Core Network data source 102b with Network processors 201. The Network processors 201 are also communicatively connected with Baseband processor's 202, which generate using one or more radio chains, and one or more radio antennas, the RANs, here First RAN 109a and Second RAN 109b. In the initial setup of the embodiment illustrated in FIG. 1B, a First amount of wireless Access Spectrum 211a has been allocated to First RAN 109a, and a Second amount of wireless Access Spectrum has been allocated to Second RAN 109b.

Figure 1C:
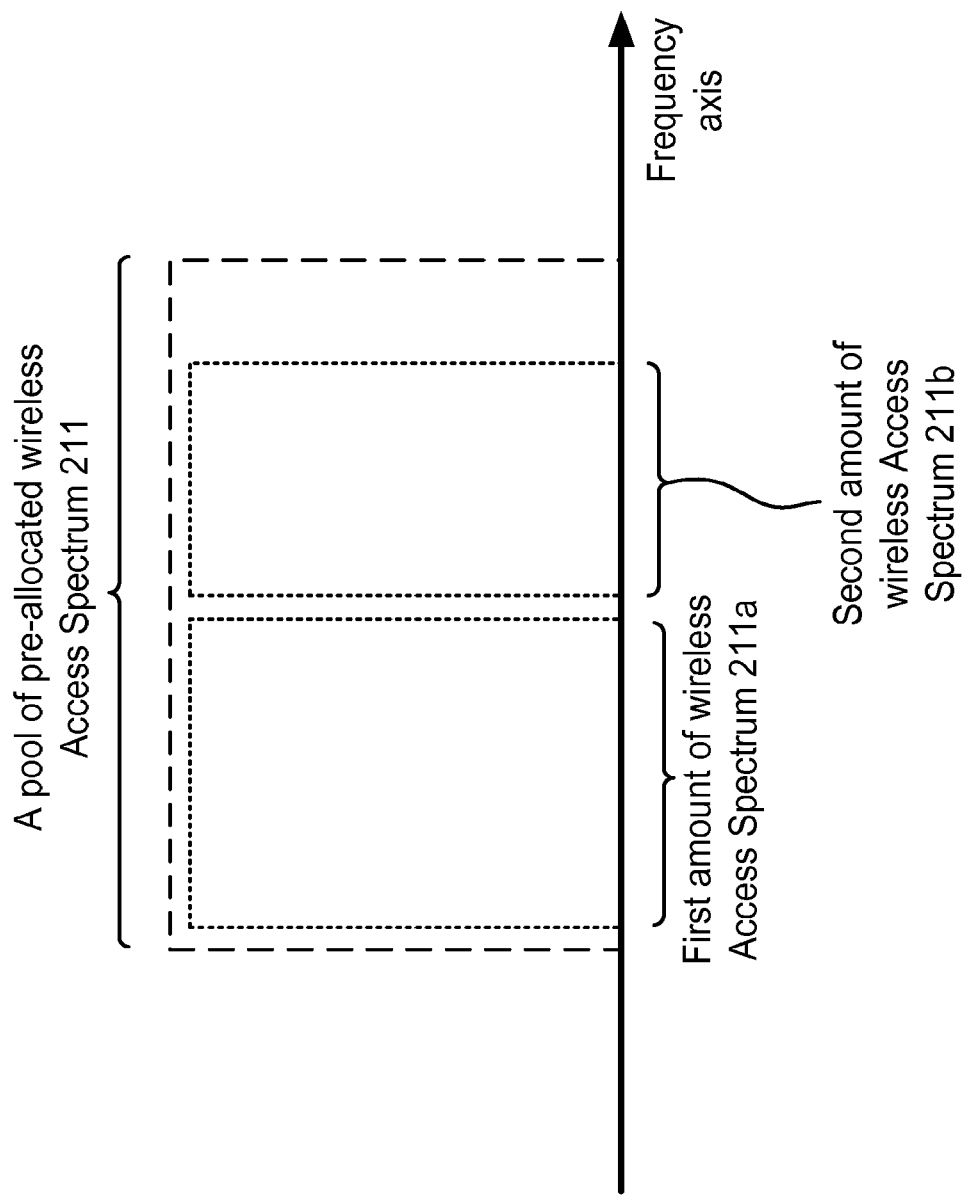
FIG. 1C illustrates one embodiment a possible allocation of wireless Access Spectrum to two Radio Access Networks (RANs)

FIG. 1C illustrates one embodiment a possible allocation of wireless Access Spectrum to two Radio Access Networks (RANs). A certain amount of wireless Access Spectrum has been pre-allocated 211 to a wireless BS and to an associated plurality of two or more RANs. Further, all or part of the pre-allocated wireless Access Spectrum 211 may be dynamically allocated as a First amount of wireless Access Spectrum 211a to a First RAN 109a or as a Second amount of wireless Access Spectrum 211b to a Second RAN 109b. In FIG. 1C, not all of 211 has been allocated to 211a or 211b. Rather, there is a small amount of frequency between 211a and 211b that has not been allocated, possibly as a guard frequency against inter-Operator interference. Similarly, there is a small amount of frequency on the left of 211a, in a frequency lower than the lowest boundary of the 211a range, that has not been allocated, and this, too, might be a guard frequency. In addition, there is a greater amount of frequency at a higher range than 211b, still within 211 but to the right of 211b, that has not been allocated, and this may be partially a guard frequency, possibly a reserve, possibly allocated to a different Operator or a different purpose. The main point is that the total frequency in 211a and 211b combined may equal, or may be less than, but may not exceed, the pre-allocated wireless Access Spectrum 211. Further, the allocation of 211 between 211a and 211b may be done at the same time as the allocation of 211, or may be done after the allocation of 211, but in all cases, no frequency is allocated among Operators until there has been or is simultaneously a pool of pre-allocated wireless Access Spectrum 211.

Figure 2:
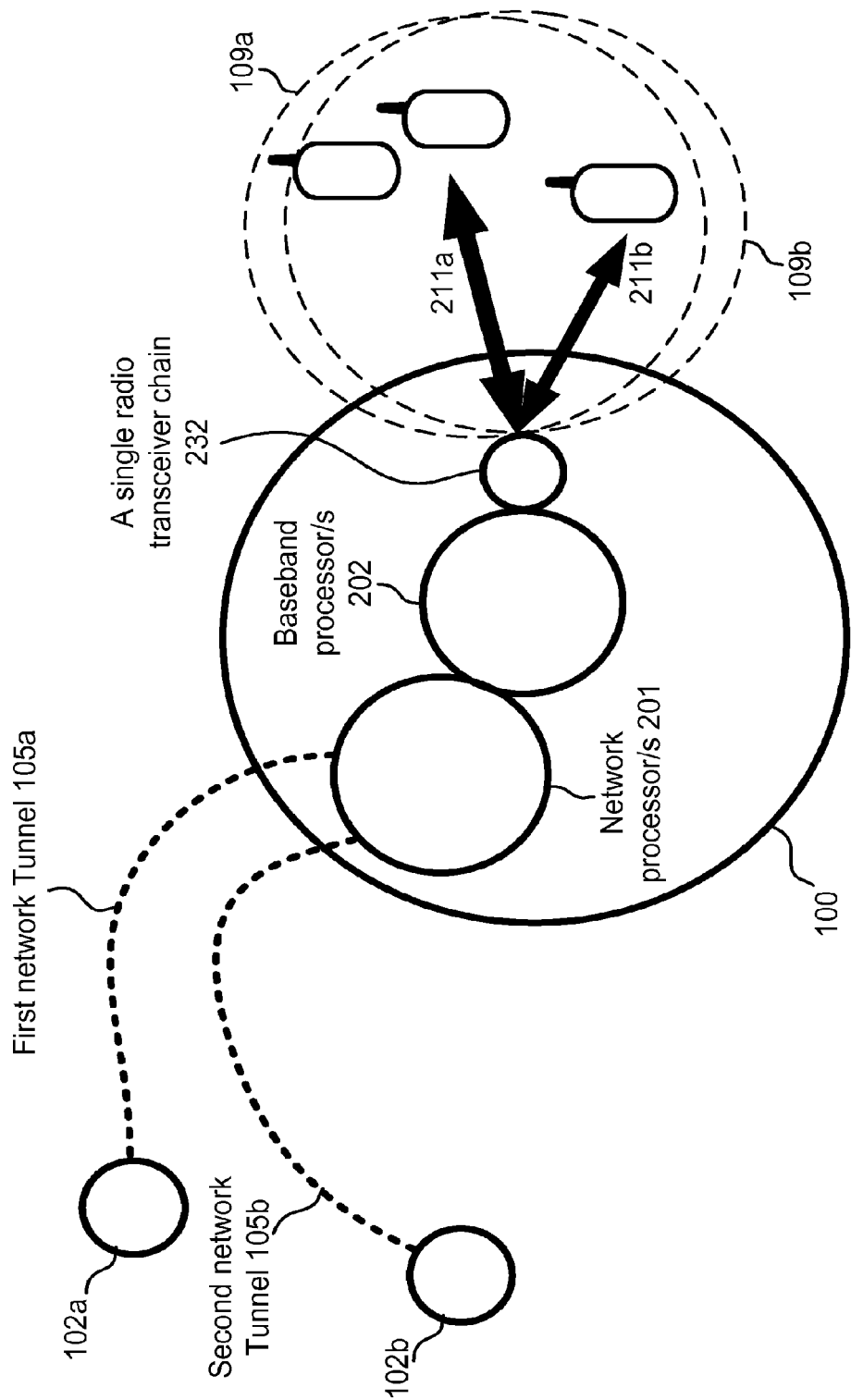
FIG. 2 illustrates one embodiment of components comprising a system of a wireless Base Station (BS) communicating with multiple Radio Access Networks (RANs), in which two RANs are sharing one radio transceiver chain.

FIG. 2 illustrates one embodiment of components comprising a system of a wireless Base Station (BS) 100 generating multiple Radio Access Networks (RANs) 109a & 109b, in which the two RANs 109a & 109b are sharing one radio transceiver chain 232. In FIG. 2, there is a single radio transceiver chain 232 utilized by the Baseband processors 202 to generate the RANs 109a and 109b. As described previously, a First amount of wireless Access Spectrum 211a has been allocated to First RAN 109a, and a Second amount of wireless Access Spectrum 211b has been allocated to Second RAN 109b. Since both 109a and 109b communicate with wireless BS 100 through the same radio transceiver chain 232, the coverage areas of 109*a* and 109*b* will be either the same or very similar.

Figure 3:
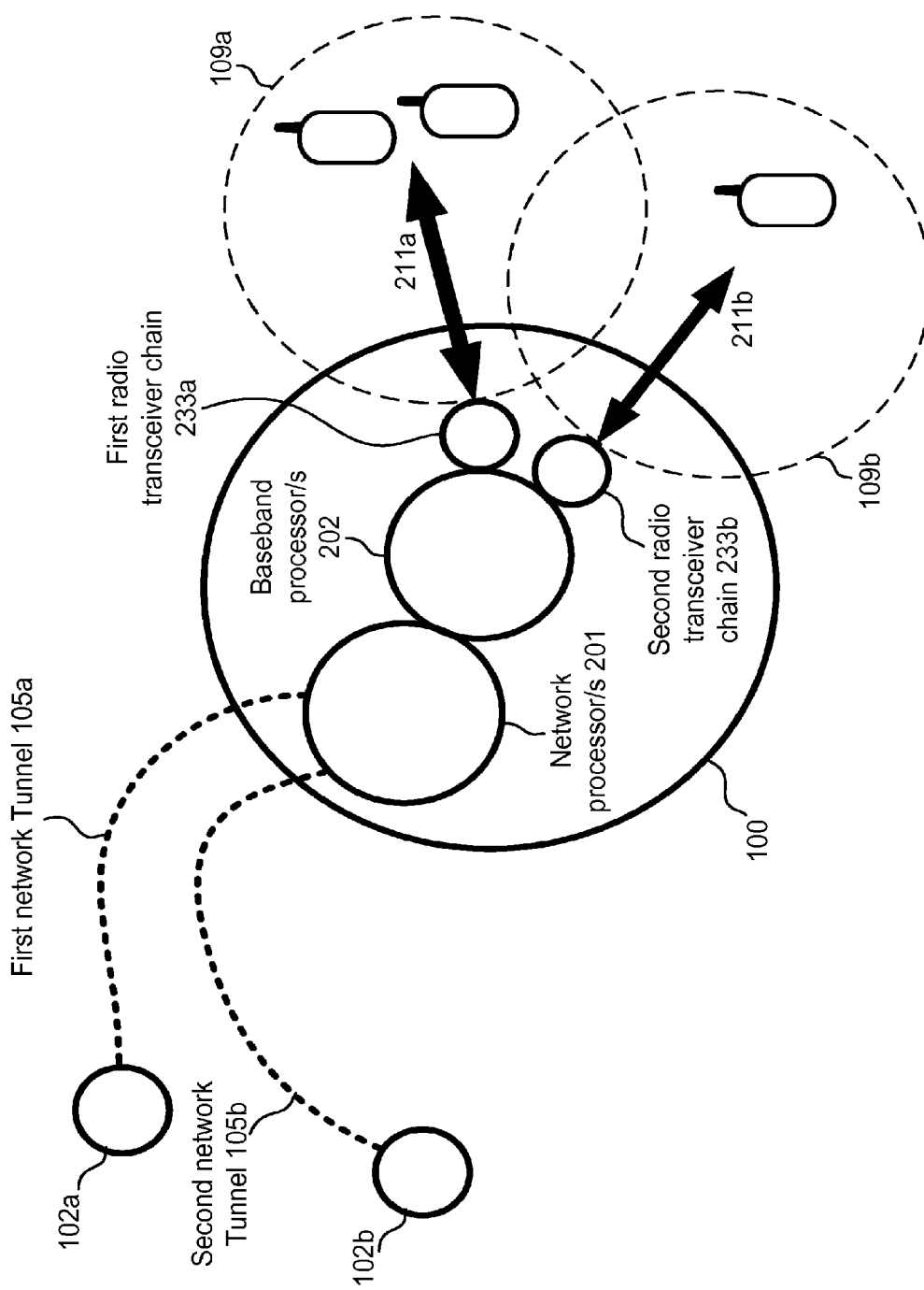
FIG. 3 illustrates one embodiment of components comprising a system of a wireless Base Station (BS) communicating with multiple Radio Access Networks (RANs), in which each of two RANs has its own radio transceiver chain, and the RANs share other resources within the wireless BS.

FIG. 3 illustrates one embodiment of components comprising a system of a wireless Base Station (BS) 100 communicating with multiple Radio Access Networks (RANs) 109*a* & 109*b*, in which each of two RANs 109*a* & 109*b* has its own radio transceiver chain 233*a* & 233*b*, and the RANs 109*a* & 109*b* share other resources within the wireless BS 100. FIG. 3 has the same components has does FIG. 2, except FIG. 3 does not have a single radio transceiver chain 232. Rather, FIG. 3 has two transceiver chains, which are First radio transceiver chain 233*a* that is utilized by Baseband processor/s 202 to generate First RAN 109*a* using the First amount of wireless Access Spectrum 211*a*, and Second radio transceiver chain 233*b* that is utilized by Base Band processor/s 202 to generate Second RAN 109*b* using the Second amount of wireless Access Spectrum 211*b*. As shown in FIG. 3, since each RAN has its own radio transceiver chains, the RAN coverage areas are essentially independent. The coverage areas might not overlap at all, might overlap slightly as is shown in FIG. 3, or might overlap substantially as is shown in FIG. 2.

In one embodiment, there is a wireless Base Station (BS) 100 system to directly communicate with Core Network data sources 102*a* & 102*b*, on one side, and to directly provide multiple corresponding Radio Access Networks (RANs) 109*a* & 109*b* on the other side. This system may include a network processor 201 operative to maintain at least two network Tunnels 105*a* & 105*b* extending directly to at least two corresponding Core Network data sources 102*a* & 102*b*, one or more Baseband processors 202 operative to create at least two RANs 109*a* & 109*b* substantially simultaneously, and one or more radio transceiver chains 232, 233*a* and 233*b*, operative to accommodate the one or more Baseband processors 202 in creating the at least two RANs 109*a* & 109*b* substantially simultaneously. In one configuration of the embodiment, the system may be configured to split dynamically a pool of pre-allocated wireless Access Spectrum 211 between the at least two RANs 109*a* & 109*b* according to one or more criteria, reconfigure the at least one Baseband Processor 202 to maintain at least two RANs 109*a* & 109*b* according to the split of spectrum between the two RANs 109*a* & 109*b*, and operate the at least two RANs 109*a* & 109*b* using data communicated with the corresponding at least two Core Network data sources 102*a* & 102*b* via the corresponding at least two network Tunnels 105*a* & 105*b*.

In an alternative embodiment of the embodiment just described, at least one of the criteria used to split dynamically a pool of pre-allocated wireless Access Spectrum 211 between at least two RANs 109*a* & 109*b*, is based on dynamic data rate requirements of at least one of the Core Network data sources 102*a* & 102*b*.

In another alternative embodiment of the embodiment described above, at least one of the criteria used to split dynamically a pool of pre-allocated wireless Access Spectrum 211 between at least two RANs 109*a* & 109*b*, is based on measuring data rates over at least one of the RANs 109*a* & 109*b*.

In another alternative embodiment of the embodiment just described, at least one of the criteria used to split dynamically a pool of pre-allocated wireless Access Spectrum 211 between at least two RANs 109*a* & 109*b*, is based on measuring data rates over at least one of the network Tunnels 105*a* & 105*b*.

In another alternative embodiment of the embodiment just described, the dynamic split of pre-allocated wireless Access Spectrum creates at least two amounts of wireless Access Spectrum, and each amount of wireless Access Spectrum after the split is allocated to one of the at least two RANs.

In one possible configuration of the alternative embodiment in which each amount of wireless Access Spectrum after the split is allocated to one of the at least two RANs, at least one of the amounts of wireless Access Spectrum 211*a* & 211*b* allocated to the RANs 109*a* & 109*b*, is smaller than the other amount of allocated wireless Access Spectrum 211*a* & 211*b*. In other words, either 211*a* is greater than 211*b*, or 211*b* is greater than 211*a*, but in this embodiment 211*a* is not equal to 211*b*.

Figure 4:
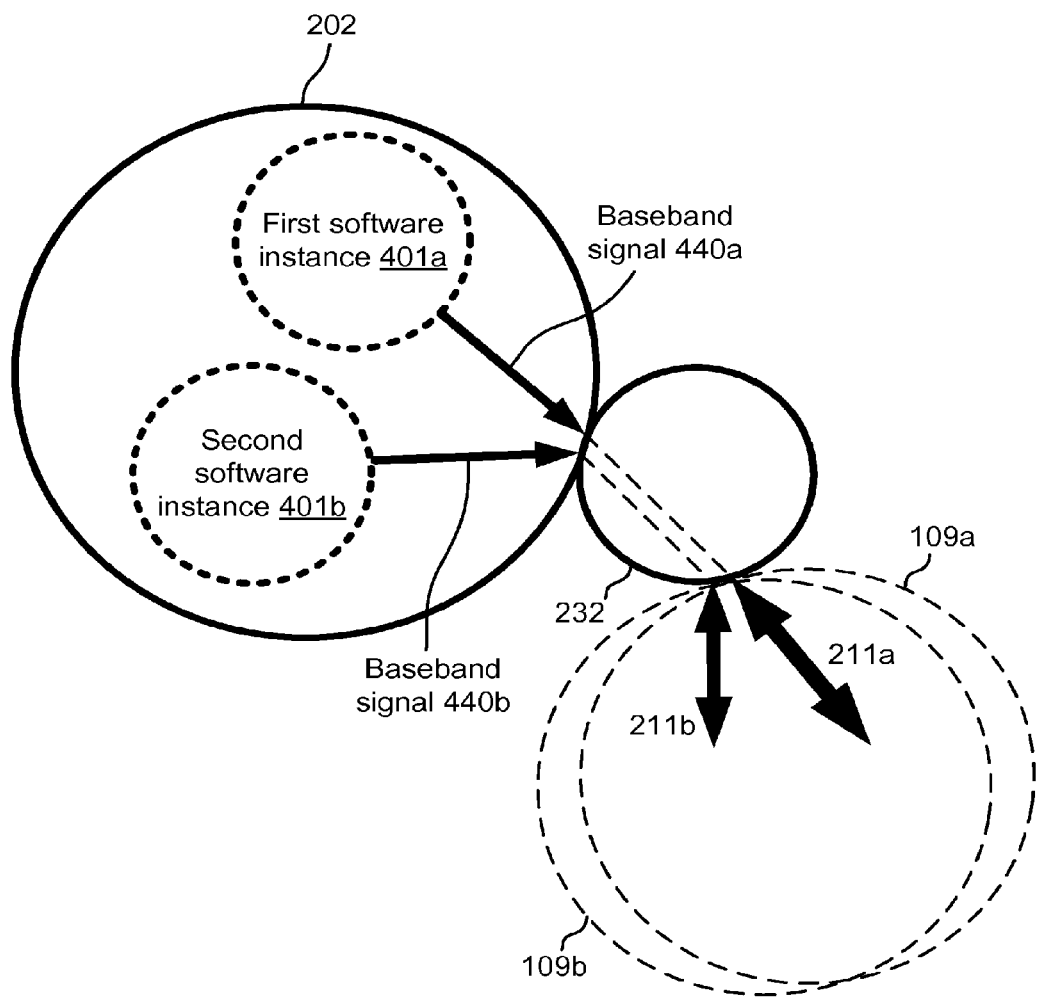
FIG. 4 illustrates one embodiment of a Baseband Processor included as part of a system of a wireless Base Station (BS) communicating with multiple Radio Access Networks (RANs), in which two RANs are sharing one radio transceiver chain.

FIG. 4 illustrates one embodiment of a Baseband processor 202 in a system of a wireless Base Station (BS) 100 generating multiple Radio Access Networks (RANs) 109*a* & 109*b*, in which two RANs 109*a* & 109*b* are sharing one radio transceiver chain 232. In this embodiment, the Baseband processor 202 may be reconfigured by programming. In one possible embodiment, reconfiguration by programming is implemented by two software changes, termed in FIG. 4, "First software instance 401*a*" and "Second software instance 401*b*". In 401*a*, the software instance is associated with First RAN 109*a*, and 401*a* creates Baseband signal 440*a*, having a bandwidth that is dynamically related to the amount of wireless Access Spectrum 211*a* allocated to First RAN 109*a*. Correspondingly, in 401*b* the software instance is associated with Second RAN 109*b*, and 401*b* creates Baseband signal 440*b*, having a bandwidth that is dynamically related to the amount of wireless Access Spectrum 211*b* allocated to First RAN 109*b*. In FIG. 4, the relative bandwidth between 109*a* and 109*b* are intimately related, since the total amount of bandwidth allocated to two RANs 109*a* & 109*b* cannot exceed the initial allocation 211. Similarly, the relative bandwidths of the Baseband signals 440*a* & 440*b* are intimately related, since the two bandwidths together cannot exceed the allocation 211.

Figure 5:
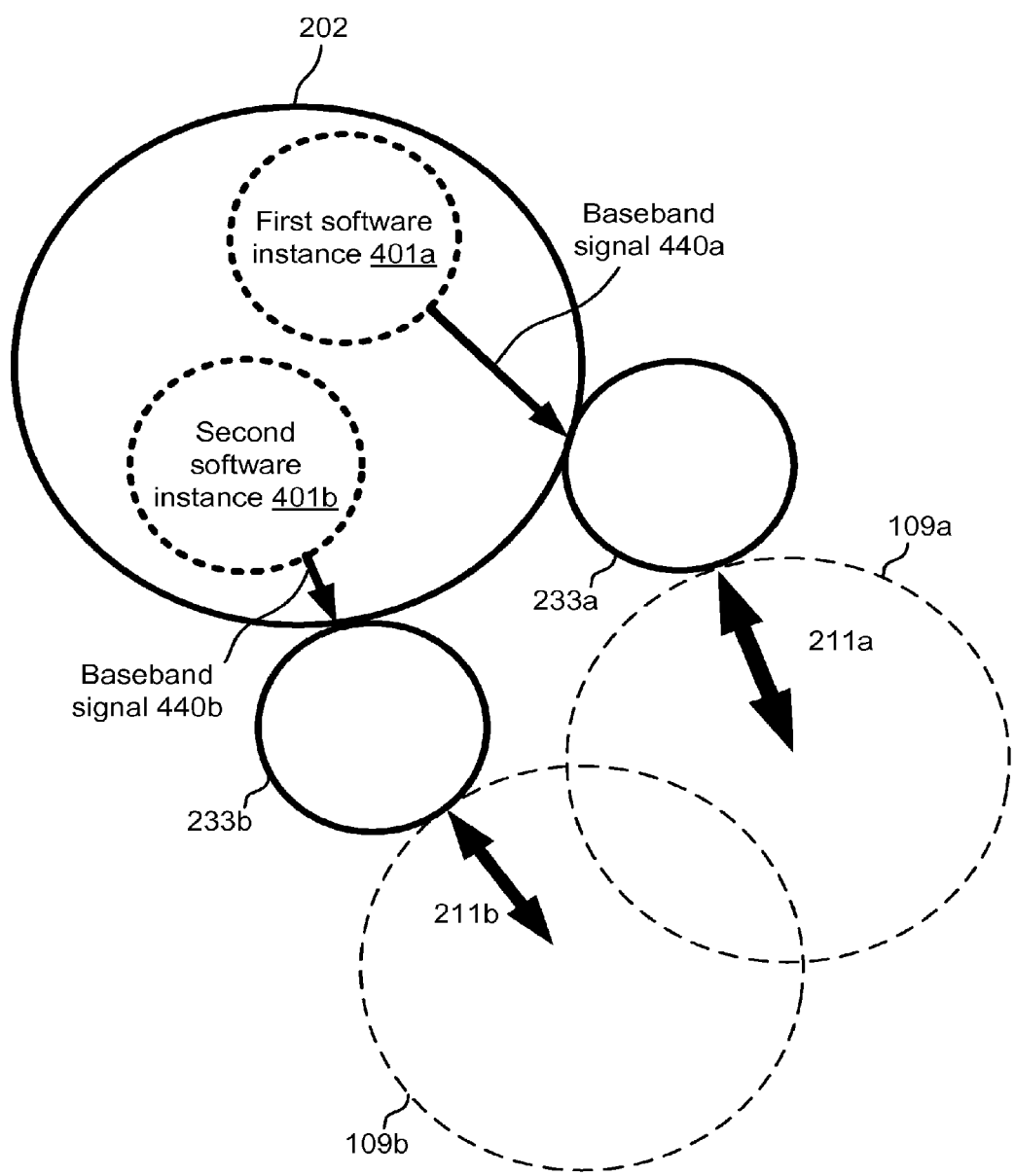
FIG. 5 illustrates one embodiment of a Baseband Processor included as part of a system of a wireless Base Station (BS) communicating with multiple Radio Access Networks (RANs), in which each of two RANs has its own radio transceiver chain, and the RANs share other resources within the wireless BS.

FIG. 5 illustrates one embodiment of a Baseband processor 202 in a system of a wireless Base Station (BS) 100 generating multiple Radio Access Networks (RANs) 109*a* & 109*b*, in which each of two RANs 109*a* & 109*b* has its own radio transceiver chain, 233*a* for First RAN 109*a* and 233*b* for Second RAN 109*b*. In this embodiment, First software instance 401*a* creates Baseband signal 440*a*, which the Baseband processor 202 communicates to the First radio transceiver chain 233*a*, which communicates Baseband signal 440*a* over allocated frequency 211*a* to First RAN 109*a*. Also in this embodiment, Second software instance 401*b* creates Baseband signal 440*b*, which the Baseband processor 202 communicates to the Second radio transceiver chain 233*b*, which communicates Baseband signal 440*b* over allocated frequency 211*b* to Second RAN 109*b*.

Figure 6A:
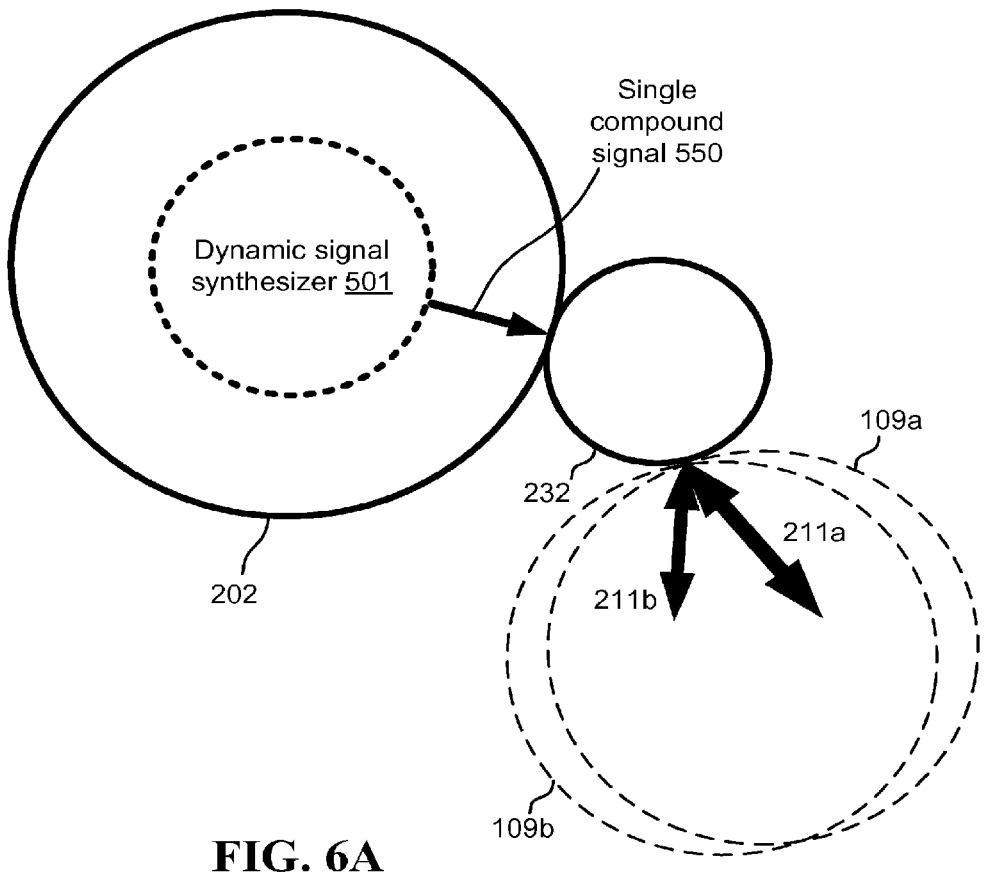
FIG. 6A illustrates one embodiment of the functioning of a Baseband Processor in a system comprising a wireless Base Station (BS) communicating with multiple Radio Access Networks (RANs), in which two RANs are sharing one radio transceiver chain.
Figure 6B:
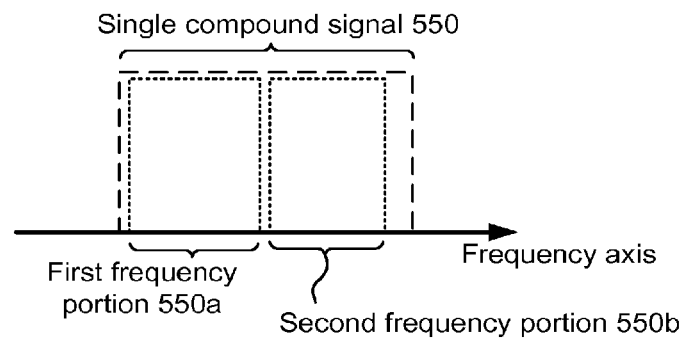
FIG. 6B illustrates one embodiment of a possible allocation of wireless Access Spectrum to two Radio Access Networks (RANs), in which the allocation can be changed dynamically.

FIG. 6A and FIG. 6B illustrate one embodiment of a Baseband processor 202 in a system of a wireless Base Station (BS) 100 generating multiple Radio Access Networks (RANs) 109*a* & 109*b*, in which two RANs 109*a* & 109*b* are sharing one radio transceiver chain 232. In this embodiment, the Baseband processor 202 may be reconfigured by programming. In one possible embodiment, reconfiguration by programming is implemented by a Dynamic signal synthesizer 501 dynamically synthesizing a single compound signal 550 on Baseband processor 202. The single compound signal 550 has at least two frequency portions 550*a* & 550*b*, in which each frequency portion is associated with one of the RANs 109*a* & 109*b*, and each of the frequency portions 550*a* & 550*b* is dynamically related to the amount of wireless Access Spectrum allocated 211a & 211b to the RANs 109a & 109b. As an example, 501 creates compound signal 550 which includes a frequency portion 550a associated with First RAN 109a and dynamically related to First amount of wireless Access Spectrum 211a, and which also includes frequency portion 550b associated with Second RAN 109b and dynamically related to Second amount of wireless Access Spectrum 211b. In this sample embodiment, the dynamic signal synthesizer 501 fills the role formerly filled by First software instance 401a and Second software instance 401b in FIG. 4. Since FIG. 6A, like FIG. 4, has only one radio transceiver chain 232, the coverage areas of 109a and 109b overlap substantially.

In one embodiment, a wireless Base Station (BS) 100 system directly communicates with Core Network data sources 102a & 102b, on one side, and directly provides multiple corresponding Radio Access Networks (RANs) 109a & 109b on the other side, in which different amounts of wireless Access Spectrum have been allocated to RANs 109a & 109b, the following additional elements may appear. (1) The at least one Baseband processor 202 is programmable to an alternative configuration. (2) The Baseband processor 202 is reconfigured by at least two software instances 401a & 401b on Baseband processor 202, each software instance associated with at least one of the RANs 109a & 109b, and each software instance 401a & 401b creates a Baseband signal 440a & 440b that has a bandwidth dynamically related to the amount of wireless Access Spectrum allocated to the RAN by the dynamic split of wireless Access Spectrum. For example, 401a creates 440a that is dynamically related to 211a, and 401b creates 440b that is dynamically related to 211b. In one alternative embodiment of this embodiment, there is only one radio transceiver chain 232, and the Baseband signals 440a & 440b of the least two software instances 401a & 401b are fed to this one chain 232, thereby generating the at least two RANs 109a & 109b, each RAN driven by one of the corresponding Baseband signals 109a by 401a and 109b by 401b. In a different alternative embodiment of the embodiment described above, there are two radio transceiver chains 233a & 233b rather than the one chain 232, so 401a creates 440a that is fed to transceiver chain 233a which then generates First RAN 109a, and 401b creates 440b that is fed to transceiver chain 233b which then generates Second RAN 109b.

In one embodiment a wireless Base Station (BS) 100 system directly communicates with Core Network data sources 102a & 102b, on one side, and directly provides multiple corresponding Radio Access Networks (RANs) 109a & 109b on the other side, in which different amounts of wireless Access Spectrum have been allocated to RANs 109a & 109b, the following additional elements may appear. (1) The at least one Baseband processor 202 is programmable to an alternative configuration. (2) The Baseband processor 202 is reconfigured by a dynamic signal synthesizer 501 dynamically synthesizing a single compound signal 550 on the at least one Baseband processor 202, the compound signal 550 having at least two frequency portions 550a & 550b, each of the two frequency portions 550a & 550b associated with one of the at least two RANs 109a & 109B, and each of the frequency portions 550a & 550b is dynamically related to the amount of wireless Access Spectrum 550a & 550b allocated for each of the RANs 109a & 109b by the frequency split.

In an alternative embodiment of the embodiment described immediately above, there is a single radio transceiver chain 232, and the single compound signal 550 is fed to the single radio transceiver chain 232, thereby generating the at least two RANs 109a & 109b, in which each is driven by one of the two frequency portions 550a & 550b. In one possible configuration of this alternative embodiment of the embodiment described immediately above, each of the two RANs is either WiMAX or LTE, the single compound signal 550 is an Orthogonal Frequency Division Multiple Access (OFDMA) signal, and the two frequency portions 550a & 550b comprises at least one unique sub-channel of the OFDMA signal.

Figure 7:
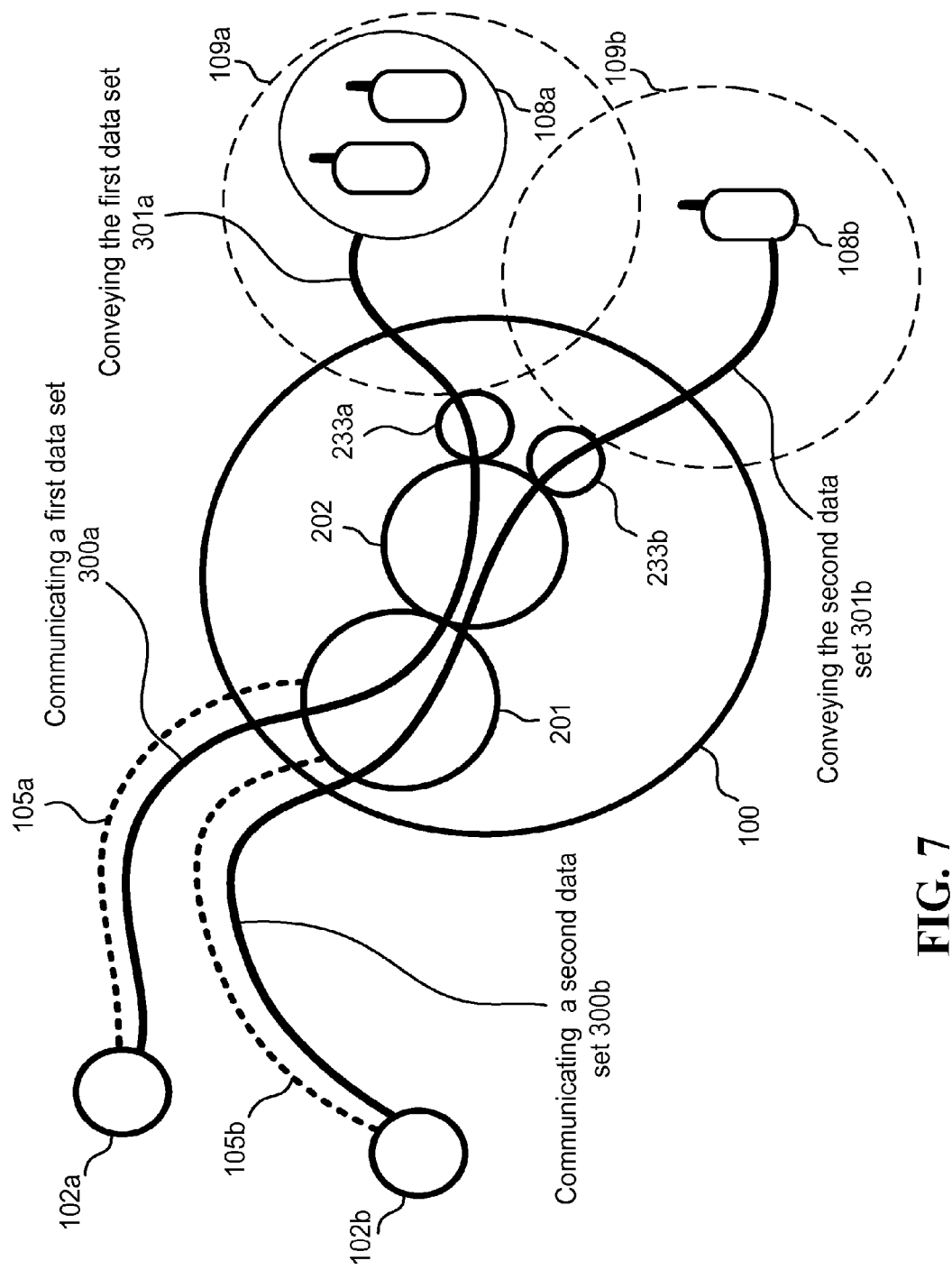
FIG. 7 illustrates one embodiment of components comprising a system of a wireless Base Station (BS) communicating with multiple Radio Access Networks (RANs), in which is also illustrated one possible configuration of a communication link from multiple Core Networks through a wireless Base Station to multiple RANs and then to multiple sets of wireless Subscriber Stations.

FIG. 7 illustrates one embodiment of components comprising a system communicating between Core Network data sources 102a & 102b and wireless Subscriber Stations 108a & 108b, in which a first data set is communicated 300a from First Core Network data source 102a via the logical link network Tunnel 105a to wireless Base Station 100, then to Network processor 201, Baseband processor 202, and First radio transceiver chain 233a, after which the first data set is conveyed 301a by the wireless BS 10 to the First RAN 109a, and finally to a first set of wireless Subscriber Stations 108a. Also in this embodiment, a second data set is communicated 300b from Second Core Network data source 102b via the logical link network Tunnel 105b to wireless Base Station 100, then to Network processor 201, Baseband processor 202, and Second radio transceiver chain 233b, after which the second data set is conveyed 301b by the wireless BS 10 to the Second RAN 109a, and finally to a second set of wireless Subscriber Stations 108b. FIG. 7 illustrates the communication path for both data sets between each Core Network and its corresponding set of wireless Subscriber Stations. Of course, data traffic travels in both direction, from Core Networks through various stages to wireless Subscriber Stations, and from wireless Subscriber Stations through various stages to Core Networks.

Figure 8:
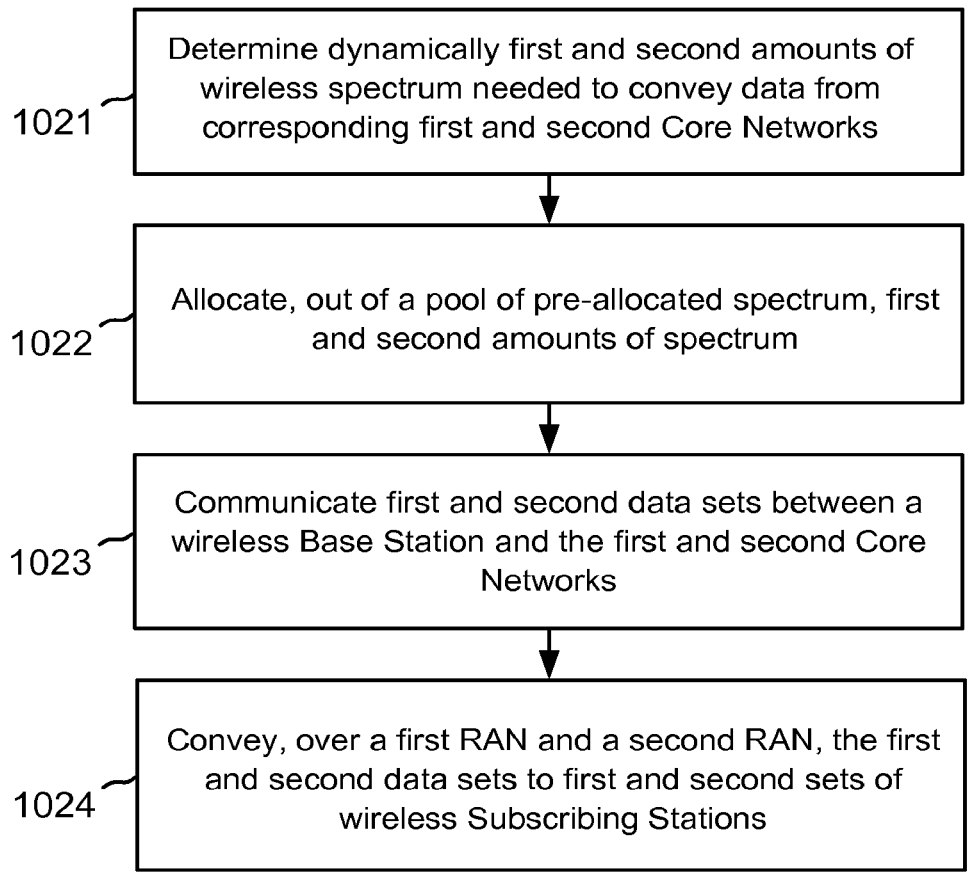
FIG. 8 illustrates one embodiment of the elements of a method for dynamically generating a plurality of Radio Access Networks (RAN) by a single wireless Station (BS)

FIG. 8 is a flow diagram illustrating one method for dynamically generating a plurality of Radio Access Networks (RAN) 109a & 109b by a single wireless Base Station (BS) 100. In step 1021, determining dynamically first and second amounts of wireless Access Spectrum 211a & 211b needed by a wireless BS 100 to wirelessly convey data from a first and a second corresponding Core Network data sources 102a & 102b. In step 1022, allocating the first and the second amounts of wireless Access Spectrum 211a & 211b, out of a pool of pre-allocated wireless Access Spectrum 211 belonging to the wireless BS 100, to a first RAN 109a and a second RAN 109b, respectively, of the wireless BS respectively. In step 1023, the wireless BS 100 communicating first and second data sets 300a & 300b, with the first and the second Core Network data sources 102A & 102b, respectively. In step 1024, the wireless BS 100 conveying the first and second data sets 301a & 301b, over the first and second RANs 109a & 109b, respectively, to first and second sets of wireless Subscriber Stations (SS) 108a & 108b, respectively.

In a first possible implementation of the method just described, further determining from time to time the first and the second amounts of wireless Access Spectrum 211a & 211b needed by the wireless BS 100 to wirelessly convey 301a & 301b the first and second data sets, and allocating from time to time the first and the second amounts of wireless Access Spectrum 211a & 211b.

In this first possible implementation of the method just described, one further possible implementation is that the first and second amounts of wireless Access Spectrum 211a & 211b are determined, at least in part, from first and second data rates associated with communicating the data sets 300a & 300b. In this further possible implementation of the possible implementation of the method just described, the first and second data rates associated with communicating the data sets 300a & 300b may be measured, or such data rates may be determined by querying the first and second Core Network data sources 102a & 102b, or it is possible to both measure the data rates and also query the Core Network data sources 102a & 102b.

In this first possible implementation of the method described above for dynamically generating a plurality of RANs 109a & 109b by a single wireless BS 100, a second further possible implementation is that at some point in time most of the pool of pre-allocated wireless Access Spectrum 211 is allocated as the first amount of wireless Access Spectrum 211a to the First RAN 109a. In this same second further possible implementation, in an additional embodiment, at some point in time most of the pool of pre-allocated wireless Access Spectrum 211 is allocated as the second amount of wireless Access Spectrum 211b to the Second RAN 109b.

In a second possible implementation of the method described above, further communicating the first and second data sets 300a & 300b with the first and second Core Network data sources 102a & 102b, using at least one Backhaul link 105.

In this second possible implementation of the method described above, one further possible implementation is that at least one Backhaul link 105 comprises a first network Tunnel 105a, connecting the first Core Network data source 102a with the wireless BS 100, and connecting the second Core Network data source 102b with the wireless BS 100.

In this same further possible implementation to the second possible implementation of the method described above, an additional embodiment would include the following additional elements. (1) The wireless BS 100 is an integrated Pico-Base Station. (2) The network Tunnels 105a & 105b are directly connected to the first and second Core Network data sources 102a & 102b, respectively. (3) The Pico-Base Station substantially does not require a dedicated infrastructure to facilitate connectivity with the Core Network data sources 102a & 102b other than the at least one Backhaul link 105 and an IP Network 101 comprising the Core Network data sources 102a & 102b.

In this second possible implementation of the method described above, a second further possible implementation is that the first data set is communicated 300a over a first Backhaul link, and a second data set is communicated over a second Backhaul link. Element 105 shows a single Backhaul link, but in this further possible implementation, there are two Backhaul links, although that is not illustrated in the Figures.

In a third possible implementation of the method described above, the First Core Network data source 102a belongs to a first Operator, the Second Core Network data source 102b belongs to a second Operator, the First RAN 109a is associated with an identity of the first Operator, and the Second RAN 109b is associated with an identity of the second Operator. The phrase "associated with" in this sense means that the name of the network is broadcast within the RAN transmissions. Hence, a First RAN 109a associated with the identity of the first Operator will broadcast, together with the RAN 109a transmissions, the name of the first network or the other identity of the first network chosen by the first Operator. Similarly, a Second RAN 109b associated with the identity of the second Operator will broadcast, together with the RAN 109b transmissions, the name of the second network or the other identity of the second network chosen by the second Operator.

Figure 9:
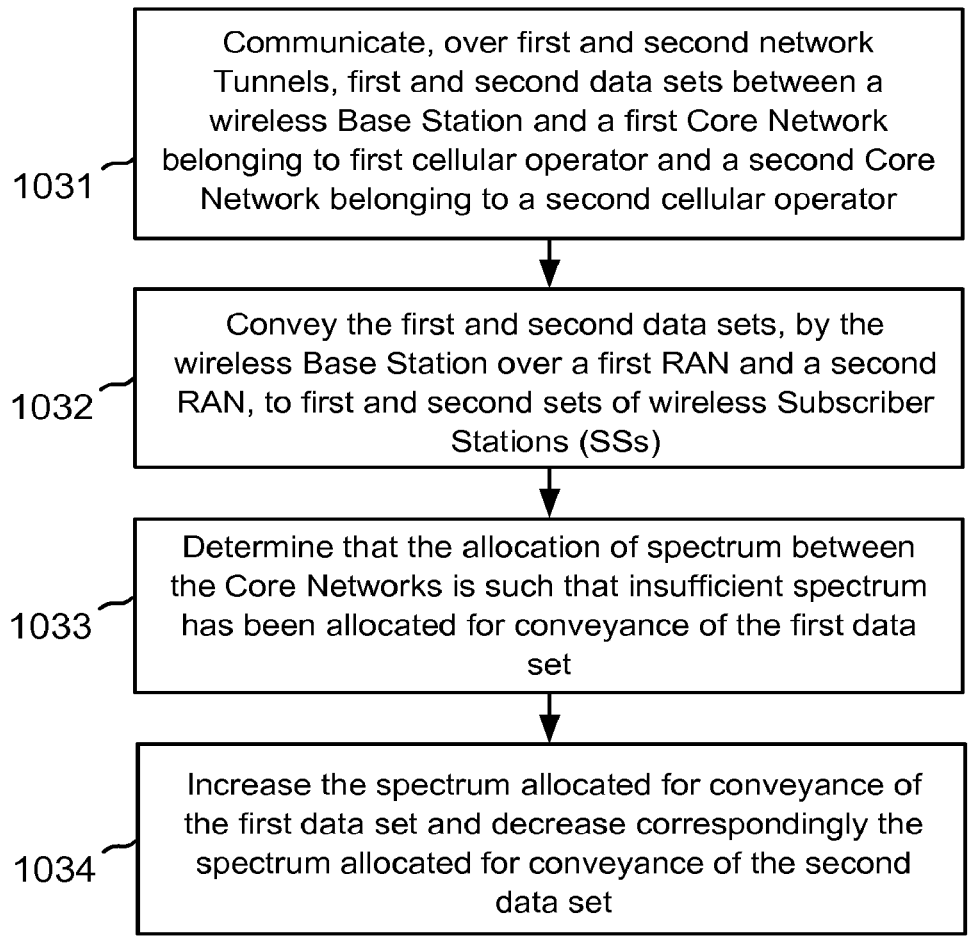
FIG. 9 illustrates one embodiment of the elements of a method for servicing multiple Operators via a single wireless Base Station (BS) utilizing dynamic allocation of spectrum.

FIG. 9 is a flow diagram illustrating one method for servicing multiple cellular Operators via a single wireless Base Station (BS) 100, utilizing dynamic allocation of spectrum. In step 1031, a wireless BS 100 communicating first 300a and a second 300b data sets with a First Core Network data source 102a belonging to a first cellular Operator and with a Second Core Network data source 102b belonging to a second cellular Operator respectively, over first and second network Tunnels 105a & 105b, respectively. In step 1032, the wireless BS 100 utilizing first and second amounts of wireless Access spectrum 211a & 211b, respectively, to convey the first 301a and second 301b data sets over first 109a and second 109b RANs, respectively, to first and second sets of wireless Subscriber Stations (SS) 108a & 108b, respectively. In step 1033, determining that the first amount of wireless Access Spectrum 211a is not sufficient to convey 300a the first data set. In step 1034, increasing the first amount of wireless Access Spectrum 211a at the expense of the second amount of wireless Access Spectrum 211b, thereby making the first amount of wireless Access Spectrum 211a better suited to convey 301a the first data set.

In a first possible implementation of the method just described, increasing the first amount of wireless Access Spectrum 211a at the expense of the second amount of wireless Access Spectrum 211b further comprises determining a third amount of wireless Access Spectrum that can be reduced from the second amount of wireless Access Spectrum 211b without substantially impairing the ability of the second amount of wireless Access Spectrum 211b to convey 301b the second data set, reducing the third amount of Wireless Access Spectrum from the second amount of wireless Access Spectrum 211b, and adding the third amount of wireless Access Spectrum to the first amount of wireless Access Spectrum 211a.

In a second possible implementation of the method described above, increasing the first amount of wireless Access Spectrum 211a at the expense of the second amount of wireless Access Spectrum 211b further comprises determining a third amount of wireless Access Spectrum to be reduced from the second amount of wireless Access Spectrum 211b and to be added to the first amount of wireless Access Spectrum 211a, such that the third amount of wireless Access Spectrum is operative to substantially equate the ability of the first amount of wireless Access Spectrum 211a to convey 301a the first data set with the ability of the second amount of wireless Access Spectrum 211b to convey 301b the second data set, reducing the third amount of Wireless Access spectrum from the second amount of wireless Access Spectrum 211b, and adding the third amount of wireless Access Spectrum to the first amount of wireless Access Spectrum 211a.

It is noted that: (1) In some embodiments, there is a fully-integrated Base Station with an ability to handle multiple bands. (2) In some embodiments, there is an array of assignable Core Network interfaces which allow multiple Operators to share the same Base Station equipment and the same physical backhaul interface. (3) In some embodiments, there is load balancing between Operators to share one or more of wireless Access Spectrum, radio antennas, available radio transmit power, backhaul, and Baseband processing power. (4) In some embodiments, both licensed and unlicensed frequencies are supported in a fully-integrated Base Stations. (5) In some embodiments, there is dynamic reallocation of wireless Access Spectrum from a relatively lightly loaded Operator to a relatively heavily loaded Operator. (6) In some embodiments, a dedicated Gateway separates traffic between the Core Networks and the Base Station. (7) In some embodiments, a fully integrated multi-Operator Base Station allows multiple Operators to share many different kinds of resources, such as, but not by limitation, wireless Access Spectrum, antenna, radio chain, transmit power, processing, backhaul to a centralized processing unit, and others. (8) Various of embodiments described herein offer the flexibility of a compact and fully integrated Base Station that permit balancing in the employment of many different kinds of resources, including, by example and not by limitation, wireless Access Spectrum, antenna, radio chain, transmit power, processing, and backhaul to a centralized processing unit that is itself part of that Base Station. (9) A multi-Operator Base Station would be ideal for wholesalers who build networks to be leased out to Operators. In other words, the availability of a multi-Operator Base Station allows new designs for networks intended specifically to allow the sharing of resources.

Figure 10A:
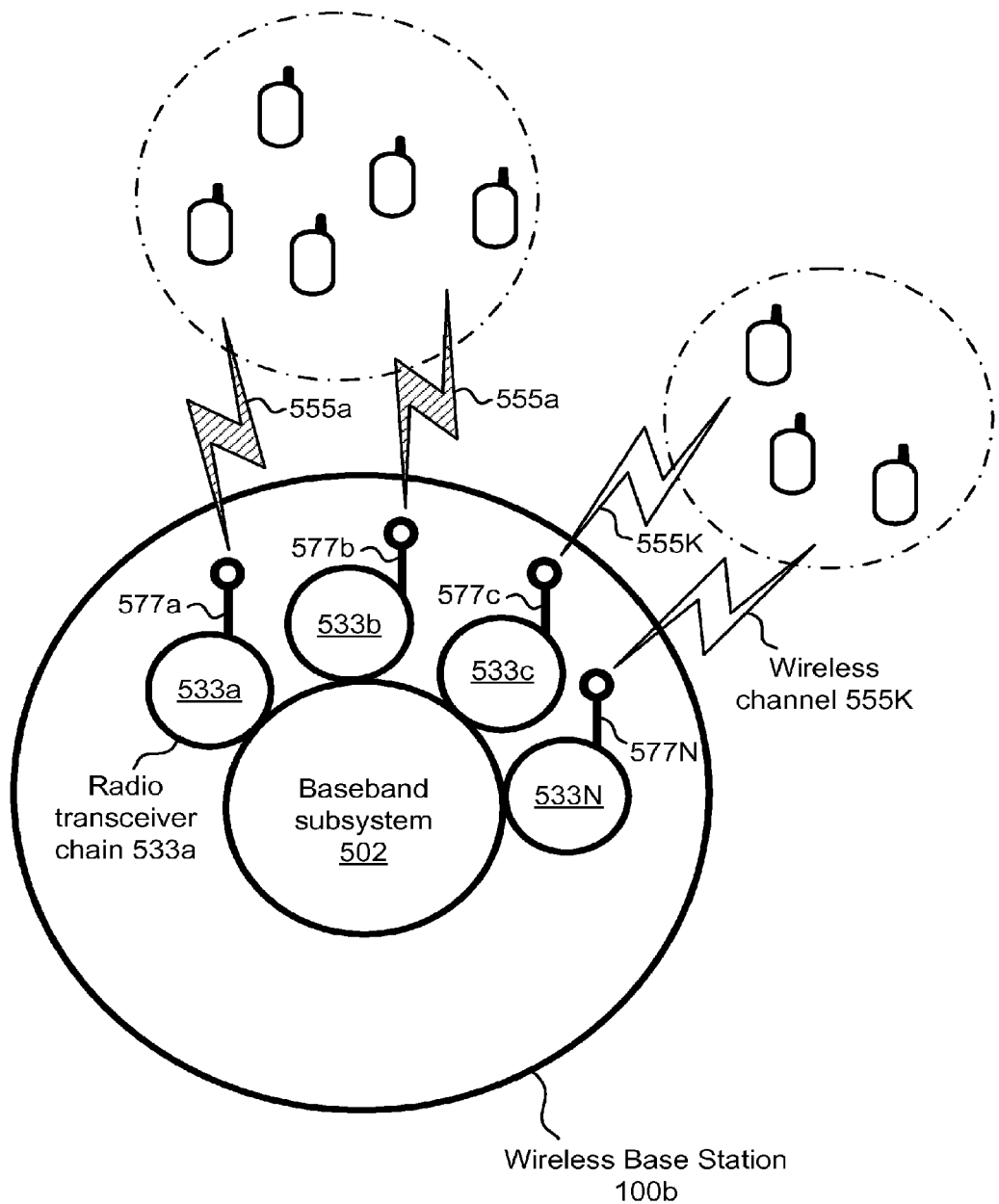
FIG. 10A illustrates one embodiment of components comprising a system for assigning dynamically a plurality of transceiver chains among a varying number of wireless channels.

FIG. 10A illustrates one embodiment of components in a system. In FIG. 10A, there is a wireless Base Station (BS) 100b, which includes a Baseband subsystem 502 communicatively connected to multiple radio transceiver chains 533a, 553b, 553c, and 533N. Each radio chain is communicatively connected to an antenna. In FIG. 10A, radio transceiver chain 533a is communicatively connected to antenna 577a, 553b to 577b, 533c to 577c, and 533N to 577N. Each antenna communicates over a wireless channel with a group of Subscriber Stations. In FIG. 10A, there are two wireless channels, which are illustrated as 555a and 555K. 555a is the radio channel that is used by the two antennas 577a and 577b. 555K is the wireless channel that is used by antenna 577c and 577N.

Figure 10B:
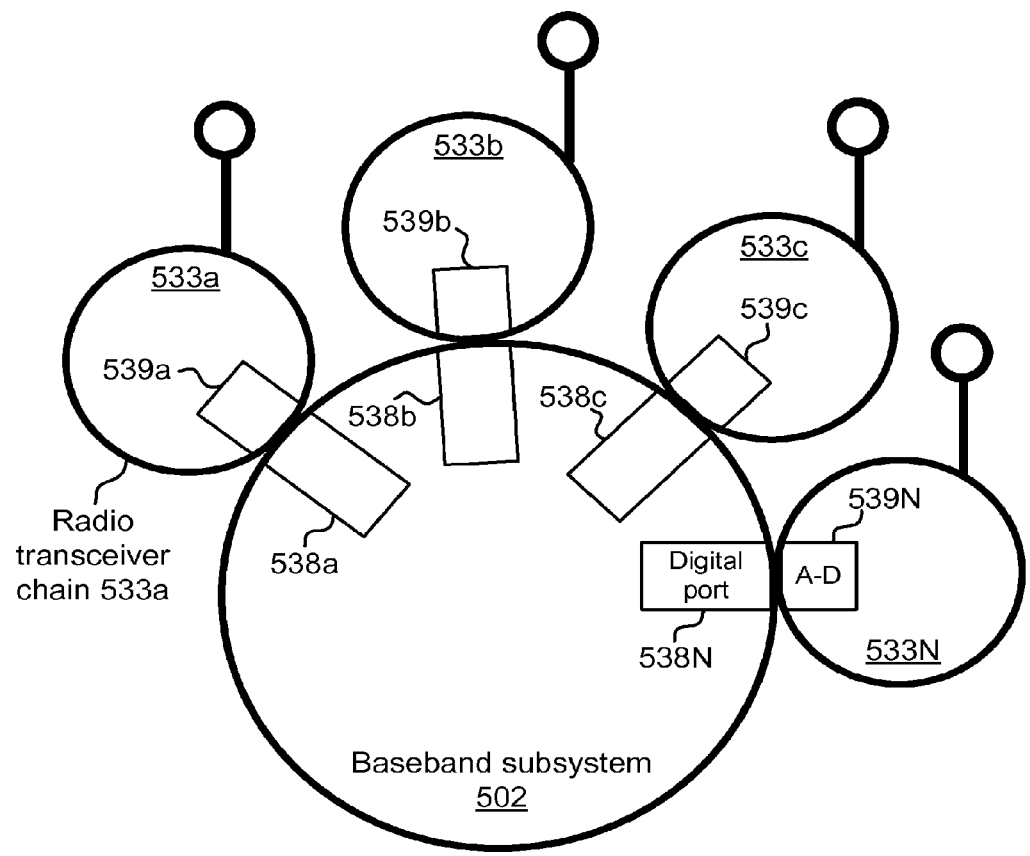
FIG. 10B illustrates one embodiment of a digital interface of a Baseband processor subsystem within a system for assigning dynamically a plurality of transceiver chains among a varying number of wireless channels.

FIG. 10B illustrates one embodiment of components in a system. In Baseband subsystem 502, there are N digital ports, illustrated by 538a, 538b, 538c, and 538N. Each digital port is connected to an Analog-Digital interface located in a radio transceiver chain. Thus, digital port 538a is connected to Analog-Digital interface 539a located within radio transceiver chain 533a. Similarly, 538b is connected to 539b within 533b, 538c is connected to 539c within 533c, and 538N is connected to 539N within 533N. One possible conversion, but not the only possibility, is a digital communication from the Baseband subsystem 502 to any one of the digital ports, then converted by the Analog-Digital interface connected to that digital port, and then communicated via the corresponding radio transceiver chain to a one or more Subscriber Stations. For example, a digital signal from 502 to 538a, converted to analog by 539a, and then transmitted by 533a to a group of Subscriber Stations. Another possible conversion, but not the only possibility, is an analog communication from a Subscriber Station, to a radio transceiver chain, converted from analog to digital by the Analog-Digital interface within the radio transceiver chain, then communicated to the corresponding digital port, and finally communicated to the Baseband subsystem. For example, an analog signal from a Subscriber Station to radio transceiver chain 533b, converted to digital by Analog-Digital interface 539b, communicated to Digital port 538b, and then communicated to Baseband subsystem 502.

In FIG. 10B, separate paths are not shown within the Baseband subsystem 502 to the Subscriber Stations. The intent is that the Baseband subsystem 502 is sufficiently strong that it communicates directly with each of the subsystems, including subsystem 538a-539a-533a, subsystem 538b-539b-533b, subsystem 538c-539c-533c, and subsystem 538N-539N-533N.

Figure 10C:
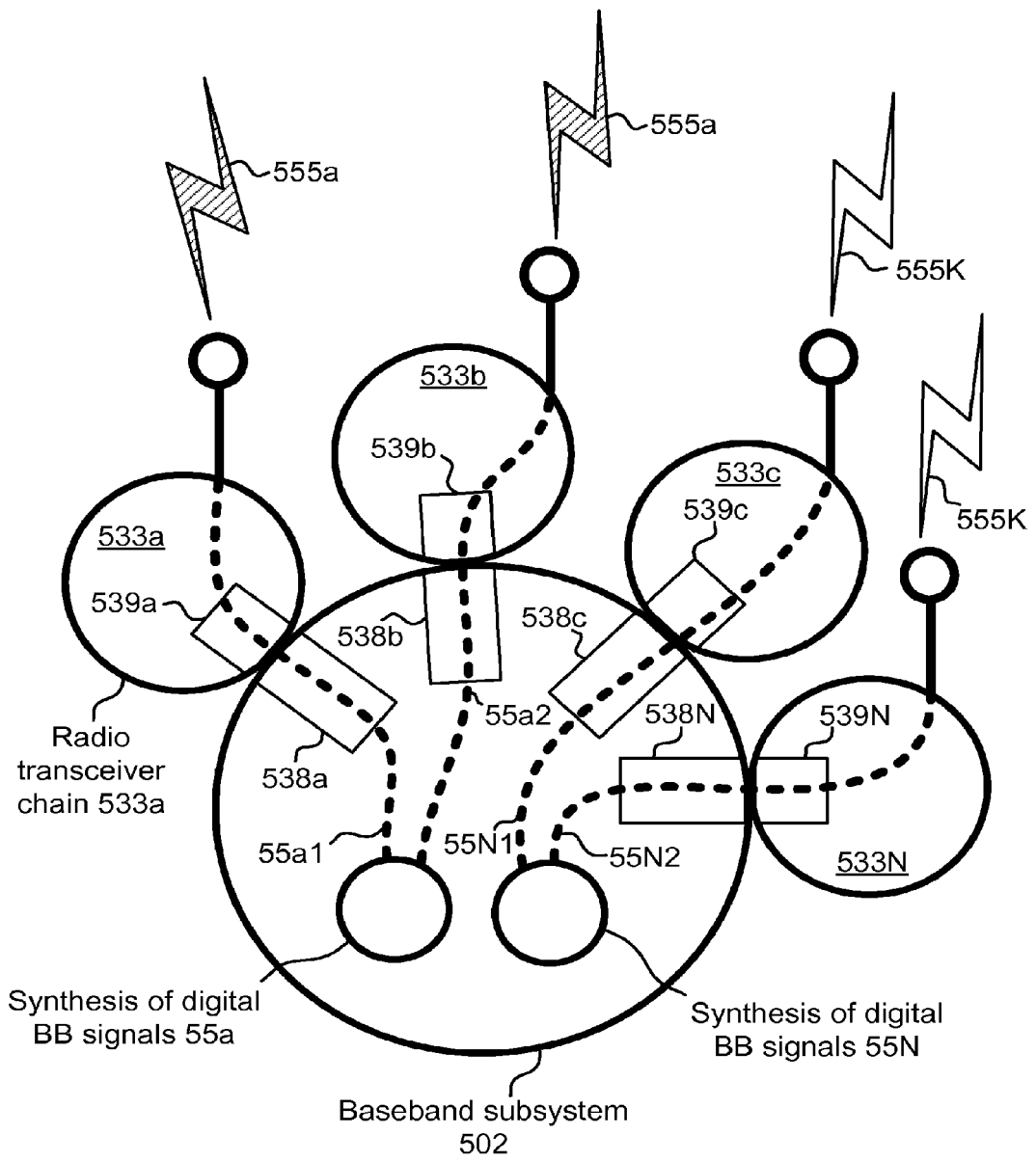
FIG. 10C illustrates one embodiment of multiple signal paths in a Baseband processor subsystem within a system including two distinct radio channels.

FIG. 10C illustrates one embodiment of multiple signals within a Baseband system 502. In FIG. 10C, Synthesis of digital Baseband signals 55a creates two signals, each of which ultimately communicates with Subscriber Stations over wireless channel 555a. One such signal is 55a1 created by 55a and conveyed to 538a, then to 539a and to 533a, then over wireless channel 555a to Subscriber Stations. Similarly, a signal 55a2 synthesized from 55a is conveyed from 55a to 538b to 539b to 533b, then over the same wireless channel 555a to Subscriber Stations. The use of the same wireless channel 555a for both signals, indicates that the same communication is being sent by multiple signals, at substantially the same time, from the Baseband system 502 to the Subscriber Stations, or conversely that a communication from one Subscriber Station will be received on wireless channel 555 and will travel via both 533a to 502 and 533b to 502. A similar process occurs between Synthesis of digital Baseband signal 55N and Subscriber Stations via wireless channel 555K, in which one signal 55N1 is conveyed from 502 to 538c to 539c to 533c to 555K to the Subscriber Stations, or vice versa from one Subscriber Station to 555k, to 533c, to 539c, to 538c to 55N within Baseband subsystem 502. A second signal 55N2 is conveyed from 502 to 538N to 539N to 533N to 555K to the Subscriber Stations, or conversely from a Subscriber Station to 555K to 533N to 539N to 538N and to 55N within Baseband subsystem 502.

Letter K representing the number of wireless channels 555a-555K in use at any particular time, is by intent not the same as letter N representing the number of radio transceiver chains 553a-553N. K may be equal N, indicating a one-to-one match between number of wireless channels 555a-555K in operation and number of signals 55a1 & 55a2 and 55N1 & 55N2 from 502 through syntheses of digital signals 55a & 55N to radio transceiver chains 533a-533N, hence to antennas 577a-577N and Subscriber Stations. K may be less than N, indicating there are fewer wireless channels 555a-555K than signals 55a1 & 55a2 and 55N1 & 55N2, and this may occur when a transmission is to be repeated in two more simultaneously conveyed signals. When a transmission is made on two or more signals as opposed to only one signal, even when all the signals are propagated on the same radio frequency, that transmission will typically have a higher radio system gain than a transmission on only one signal, which means generally that a transmission with multiple signals can have, in comparison to a transmission with one signal, any of a higher quality link (typically measured by S/N ratio), a greater distance propagation, a greater penetration power, higher data rate, or a combination of any of the foregoing.

In some embodiments, the number of Syntheses of digital Baseband signals 55a & 55N may be dynamically altered to meet temporal system demands. In some embodiments, the number of wireless channels 555a-555K may be dynamically altered to meet temporal system demands. The number of each of these elements, the Syntheses and the wireless channels, is independent from the numbers of the other elements, except that K channels may not exceed N communication paths, and the number of syntheses may not exceed N digital Baseband signals.

There are many alternative embodiments in the generation of signals to and from antennas the Subscriber Stations. For example, antennas may be a single antenna connected to a radio transceiver chain, or there may be phased array signals in use, or MIMO signal in use, or any other communication configuration. For example, there may be phased-array coherent reception, Maximal Ratio Combining (MRC), Minimum Mean Square Error (MMSE), Maximum Likelihood (ML), or any other number of algorithms in the transmission or reception of a wireless signal.

In one embodiment, there is a wireless Base Station (BS) system 100*b*, operative to assign dynamically a plurality of radio transceiver chains 533*a*-533N among a varying number of wireless channels 555*a*-555N. This wireless BS system 100*b* may include a Baseband (BB) subsystem 502, which itself may include N digital ports 538*a*-538N, operative to synthesize 55*a* & 55N N digital Baseband (BB) signals 55*a*1 & 555*a*2 and 55*n*1 & 55*n*2 associated with K wireless channels 555*a* & 555K, wherein (1) N is equal to at least 2, (2) K is equal to at most N, and (3) K is equal to at least 1. The wireless BS system 100*b* may also include N radio transceiver chains 533*a*-533N, each of which may be connected to one of the N digital ports 538*a*-538N of the BB subsystem 502 via an Analog-Digital interface 539*a*-539N. The wireless BS system 100*b* may be configured to (A) set dynamically K according to a first criterion, wherein K is a number between 1 and N, (B) assign dynamically the N radio transceiver chains 533*as*-533N among the K wireless channels 555*a*-555K according to a second criterion such that each radio transceiver chain 533*a*-533N is assigned to only one of the wireless channels 555*a*-555K, (C) synthesize 55*a*-55N, by the BB subsystem 502, the N digital BB signals 55*a*1 & 55*a*2 and 55N1 & 55N2 associated with the K wireless channels 555*a*-555K, and (D) input the N digital BB signals to the N radio transceiver chains 553*a*-533N via the corresponding N digital ports 538*a*-538N and the corresponding Analog-Digital interfaces 539*a*-539N, thereby transmitting the K wireless channels 555*a*-555K via the N radio transceiver chains 533*a*-533N. This embodiment will be called "the Dynamic Assignment embodiment", and seven alternatives to this embodiment are described below.

In a first alternative embodiment of the Dynamic Assignment embodiment, the number of wireless channels K 555*a*-555K is smaller than the number of radio transceiver chains N 533*a*-533N, which may mean that at least one of the wireless channels 555*a*-555K is transmitted via at least two of the radio transceiver chains 533*a*-533N. In one configuration of this alternative embodiment, at least two of the N digital Baseband signals 55*a*1 & 55*a*2 and 55N1 & 55N2 driving the at least two of the radio transceiver chains 533*a*-533N comprise at least two Multiple Input Multiple Output (MIMO) signals, thereby transmitting the at least one of the wireless channels using a MIMO scheme. In a second configuration of this alternative embodiment, at least two of the N digital Baseband signals 55*a*1 & 55*a*2 and 55N1 & 55N2 driving the at least two of the radio Transceiver chains 533*a*-533N comprise at least two phased-array signals, thereby transmitting the at least one of the wireless channels 555*a*-555K using a phased-array scheme comprising the at least two of the radio transceiver chains 533*a*-533N.

Figure 11:
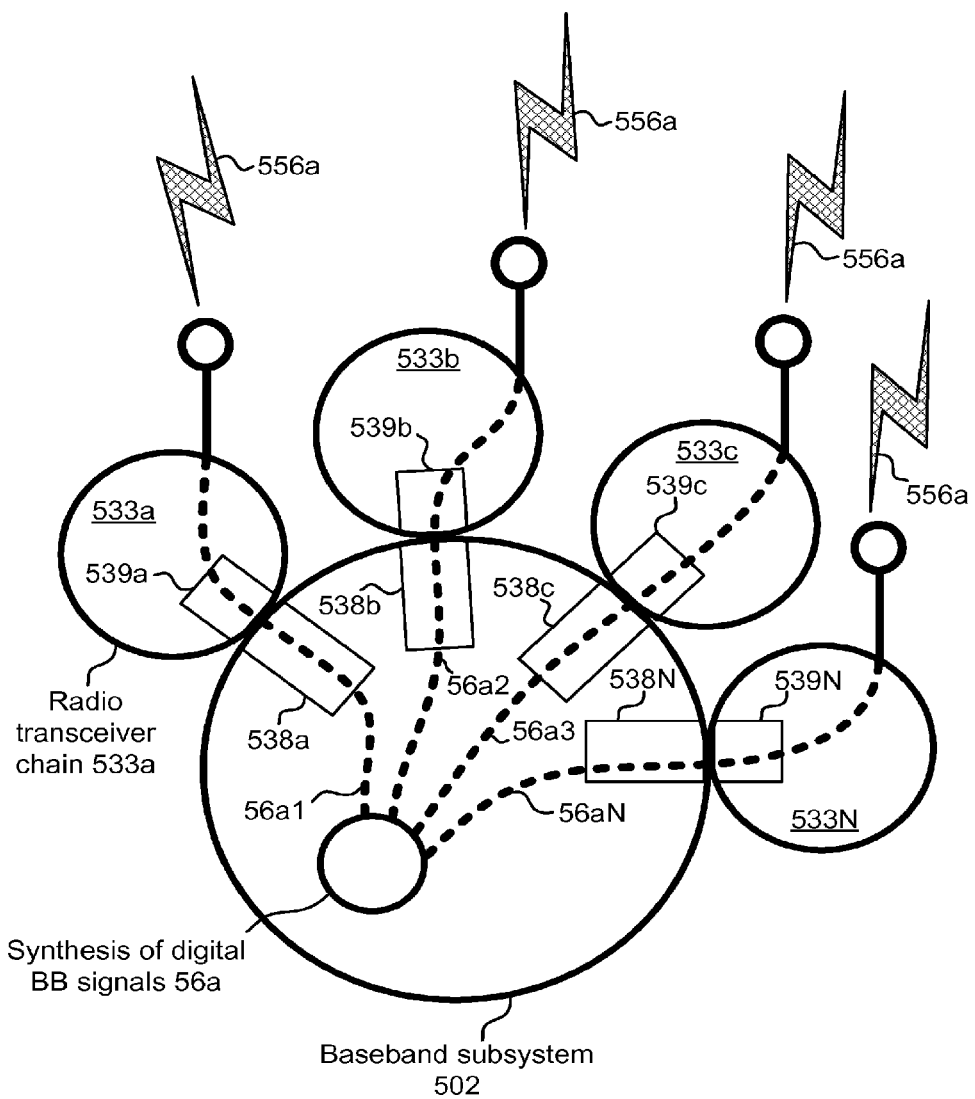
FIG. 11 illustrates one embodiment of multiple signal paths in Baseband processor subsystem within a system including one radio channel.

FIG. 11 illustrates one embodiment of multiple signals within a Baseband system 502. FIG. 11 is different in two respects from FIG. 10C. First, there is only one Synthesis of digital Baseband signals 56*a* in FIG. 11, as opposed to two in FIG. 10C. The meaning is that all of the N digital Baseband signals in FIGS. 11 56*a*1, 56*a*2, 56*a*3, and 56*a*N, are generated by a signal Synthesis 56*a* within the Baseband subsystem 502. Second, in FIG. 11 there is only one wireless channel 556*a*, driven by the same four radio transceiver chains 533*a*-533N, whereas in FIG. 10C there were two wireless channels from the same four radio transceiver chains 533*a*-533N. Where there are more chains driving one wireless channel, as there are here in FIG. 11, (1) the system gain for this wireless channel will be higher, in both directions, that is, from the radio transceiver chains to the Subscriber Stations, and from the Subscriber Stations to the radio transceiver chains, or (2) the data capacity of this wireless channel will increase.

Figure 12:
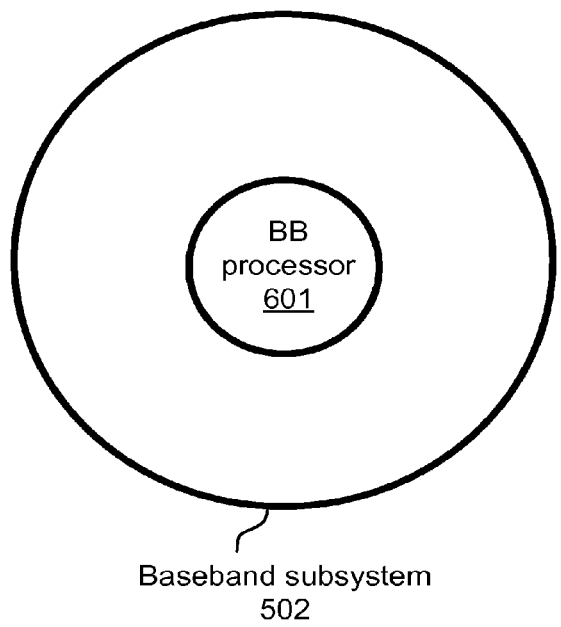
FIG. 12 illustrates one embodiment of a Baseband processor subsystem.

FIG. 12 illustrates one embodiment of a Baseband subsystem 502 in a wireless BS system 100*b*, operative to assign dynamically a plurality of radio transceiver chains 533*a*-533N among a varying number of wireless channels 555*a*-555N. The Baseband system 502 includes a single Baseband processor 601, which is operative to generate substantially simultaneously the K wireless channels 555*a*-555K and the corresponding N Baseband digital signals 55*a*1 & 55*a*2 and 55N1 & 55N2, according to the setting of K.

Figure 13:
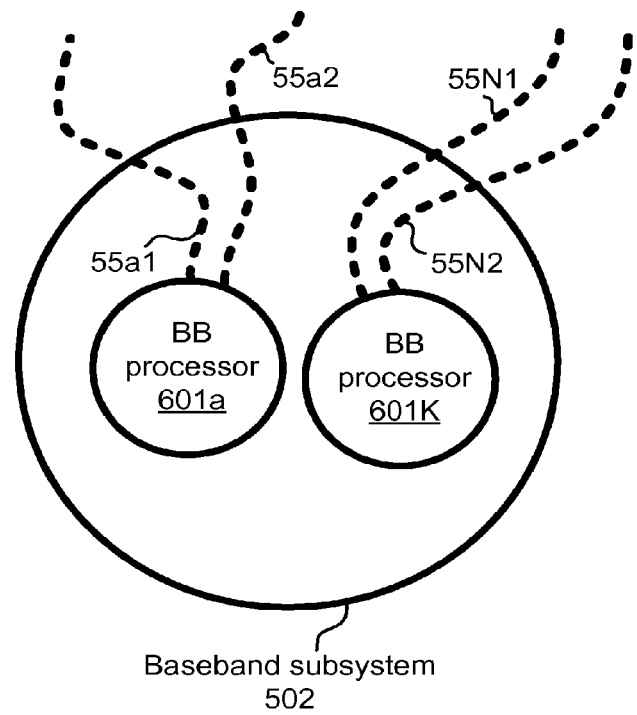
FIG. 13 illustrates one embodiment of a Baseband processor subsystem including at least two Baseband processors.

FIG. 13 illustrates one embodiment of a Baseband subsystem 502 in a wireless BS system 100*b*, operative to assign dynamically a plurality of radio transceiver chains 533*a*-533N among a varying number of wireless channels 555*a*-555N. The Baseband system comprises two or more Baseband processors 601*a* & 601K, which are operative to generate substantially simultaneously the K wireless channels 555*a*-555N and the corresponding N Baseband digital signals 55*a*1 & 55*a*2 and 55N1 & 55N2, according to the setting of K.

Figure 14:
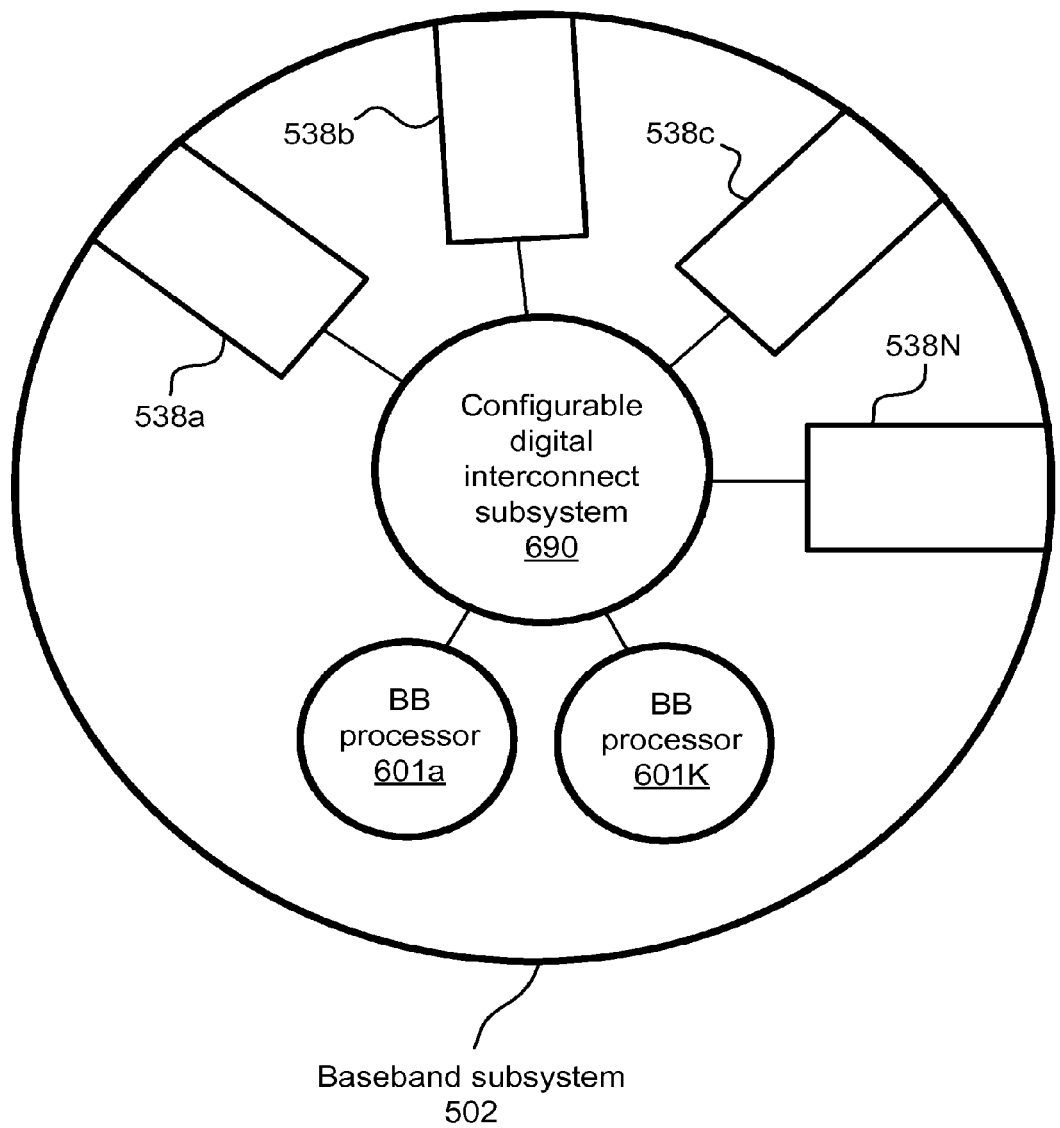
FIG. 14 illustrates one embodiment of a Baseband processor subsystem including at least two Baseband processors, in which a configurable digital interconnect subsystem connects with the Baseband processors.

FIG. 14 illustrates one embodiment of the subsystem described in FIG. 13. In FIG. 14, there is a Configurable digital interconnect subsystem 690, which interconnects each of the Baseband processors 601*a*-601K with at least some of the N digital ports 538*a*-538N, according to the setting of K and according to the assignment of the N radio transceiver chains 533*a*-533N among the K wireless channels 555*a*-555K.

In a second alternative embodiment of the Dynamic Assignment Embodiment, there is a wireless Base Station (BS) system 100*b*, operative to assign dynamically a plurality of radio transceiver chains 533*a*-533N among a varying number of wireless channels 555*a*-555N. This wireless BS system 100*b* may include a Baseband (BB) subsystem 502, which itself may include N digital ports 538*a*-538N, operative to synthesize 55*a* & 55N N digital Baseband (BB) signals 55*a*1 & 555*a*2 and 55*n*1 & 55*n*2 associated with K wireless channels 555*a* & 555K, wherein (1) N is equal to at least 2, (2) K is equal to at most N, and (3) K is equal to at least 1, wherein the wireless BS system 100*b* may be configured to set dynamically K according to the distance between a Subscriber Station and the wireless BS 100*b*, such that during the operation phase of the wireless BS 100*b* when the Subscriber Stations are relatively distant from the wireless BS 100*b*, K is set to 1, thereby creating a single wireless channel 556*a* transmitting via the N radio transceiver chains 533*a*-533N and increasing the range of the single wireless channel 556*a* to facilitate communication with the relatively distant Subscriber Station. This alternative embodiment will be called "embodiment where initial K=1", and several alternative embodiments to this embodiment will be described below.

In a first alternative embodiment of an embodiment in which initial K=1, N digital Baseband signals 56*a*-56N driving the N radio transceiver chains 533*a*-533N comprise N phased-array signals, thereby transmitting the single wireless channel 556*a* using a phased-array scheme comprising the N radio transceiver chains 533*a*-533N, wherein the Baseband subsystem 502 is reconfigured to generate the N phased-array signals accordingly.

In a second alternative embodiment of an embodiment in which initial K=1, during a later operation phase of the wireless BS 100*b* when the Subscriber Stations become closer to the wireless BS 100*b*, K is set to at least two, such that each of the wireless channels 555*a* & 555K is transmitting via less than the N radio transceiver chains 533a-533N, thereby decreasing the range of the wireless channels 555a & 555K, but increasing data throughput of the wireless BS 100b.

In such second alternative embodiment of an embodiment in which initial K=1, one alternative configuration occurs during or after a transition from a single wireless channel operation to at least two wireless channels operation. At or after this transition, the Baseband subsystem 502 is reconfigured to transition between a single wireless channel N-phased-array operation using wireless channel 556a to a multiple wireless channels MIMO operation using wireless channels 555a-555K.

In such second alternative embodiment of an embodiment in which initial K=1, one alternative configuration occurs during or after a transition from a single wireless channel operation to at least two wireless channels operation. At or after such transition, the Baseband subsystem 502 is reconfigured to transition between a transmission scheme including a single wireless channel N-level coherent phase transmission, to a transmission scheme comprising multiple wireless channels MIMO operation. In this alternative configuration, an additional possibility is that the Baseband subsystem 502 is reconfigured to transition between an N-level combining-algorithm reception mode to a multiple wireless channels MIMO reception mode, in which the N-level combining-algorithm reception mode may be any one of phased-array coherent reception, Maximal Ratio Combining (MRC), Minimum Mean Square Error (MMSE) and Maximum Likelihood (ML), or any combination of such alternative reception modes.

In such second alternative embodiment of an embodiment in which initial K=1, one alternative configuration occurs during or after a transition from a single wireless channel operation to at least two wireless channels operation. At or after such transition, the Baseband subsystem 502 is reconfigured to transition between a transmission scheme including Cyclic Delay Diversity (CDD), to a transmission scheme comprising multiple wireless channels MIMO operation. In this alternative configuration, an additional possibility is that the Baseband subsystem 502 is reconfigured to transition between an N-level combining-algorithm reception mode to a multiple wireless channels MIMO reception mode, in which the N-level combining-algorithm reception mode may be any one of Phased-array coherent reception, Maximal Ratio Combining (MRC), Minimum Mean Square Error (MMSE) and Maximum Likelihood (ML), or any combination of such alternative reception modes.

In such second alternative embodiment of an embodiment in which initial K=1, one alternative configuration occurs during the initial operation phrase of the wireless BS 100b, when all the aggregated transmission power of the N radio transceiver chains 533a-533N is used for the transmission of a single wireless channel 556a, thereby maximizing the range of the single wireless channel 556a. In this alternative configuration, a further configuration occurs in a later operation phase of the wireless BS 100b, when each of the wireless channels 555a-555K is transmitting with less than the N radio transceiver chains 533a-533N, and therefore with less power than the aggregated transmission power of the N radio transceiver chains 533a-533N, thereby decreasing the range of each of the wireless channels 555a-555N and decreasing inter-cell interferences with close-by wireless Base Stations.

In a third alternative embodiment of the Dynamic Assignment embodiment, there is a wireless Base Station (BS) system 100b, operative to assign dynamically a plurality of radio transceiver chains 533a-533N among a varying number of wireless channels 555a-555N. Such system includes a Baseband subsystem 502 comprising N digital ports 538a-538N, operative to synthesize 55a-55N N digital Baseband signals 55a1 & 55a2 and 55N1 & 55N2 associated with K wireless channels 555a-555K, wherein N is equal to at least 2, K is equal to at most N, and K is equal to at least 1. The Baseband processor 502 includes a single Baseband processor 601 operative to generate substantially simultaneously the K wireless channels 555a-555N and the corresponding N digital Baseband signals 55a1 & 55a2 and 55N1 & 55N2, according to the setting of K. In this embodiment, one configuration is where the Baseband processor 601 comprises an ASIC. In this embodiment, an alternative configuration is that the Baseband processor 601 comprises an FPGA. In this embodiment, an alternative configuration is that the Baseband processor 602 comprises a Digital Signal Processor (DSP). In the alternative configuration in which the Baseband processor 602 comprises a DSP, the simultaneous generation of K wireless channels 555a-555N and the corresponding N digital Baseband signals 55a1 & 55a2 and 55N1 & 55N2, is done at least in part in software running on the DSP.

In a fourth alternative embodiment of the Dynamic Assignment embodiment, there is a wireless Base Station (BS) system 100b, operative to assign dynamically a plurality of radio transceiver chains 533a-533N among a varying number of wireless channels 555a-555N. The system includes a Baseband subsystem 502, which comprises at least two Baseband processors 601a & 601K operative to generate substantially simultaneously K wireless channels 555a-555N and the corresponding N digital Baseband signals 55a1 & 55a2 and 55N1 & 55N2, according to the setting of K. In one configuration of this fourth alternative embodiment, each of the Baseband processors 601a & 601K is operative to generate one of the K wireless channels 555a-555N and the corresponding N digital Baseband signals 55a1 & 55a2 and 55N1 & 55N2.

In a fifth alternative embodiment of the Dynamic Assignment embodiment, there is a wireless Base Station (BS) system 100b, operative to assign dynamically a plurality of radio transceiver chains 533a-533N among a varying number of wireless channels 555a-555N. In this system, the second criterion is based on assigning more radio transceiver chains to wireless channels requiring longer range.

In one configuration of this fifth alternative embodiment, in order to achieve long range, radio transceiver chains 533a-533N convey N-level coherent phase transmissions, and receives combinable signals enabling utilization of reception algorithms such as (1) Phased-array coherent reception, (2) Maximal Ratio Combining (MRC), (3) Minimum Mean Square Error (MMSE) and (4) Maximum Likelihood (ML). In a further possible alternative embodiment of this configuration, the Baseband subsystem 502 is reconfigured to use the combinable signals as at least some of the N digital Baseband signals 55a1 & 55a2 and 55N1 & 55N2, upon exercising the assignment based on the second criterion.

In one configuration of this fifth alternative embodiment, in order to achieve long rang, radio transceiver chains 533a-533N convey Cyclic Delay Diversity (CDD) signals, and/or receive combinable signals enabling utilization of reception algorithms such as (1) Phased-array coherent reception, (2) Maximal Ratio Combining (MRC), (3) Minimum Mean Square Error (MMSE) and (4) Maximum Likelihood (ML). In a further possible alternative embodiment of this configuration, the Baseband subsystem 502 is reconfigured to use the combinable signals as at least some of the N digital Baseband signals 55a1 & 55a2 and 55N1 & 55N2, upon exercising the assignment based on the second criterion.

In a sixth alternative embodiment of the Dynamic Assignment embodiment, there is a wireless Base Station (BS) system 100b, operative to assign dynamically a plurality of radio transceiver chains 533a-533N among a varying number of wireless channels 555a-555N. In this system, the second criterion is based on assigning more radio transceiver chains 533a-533N to wireless channels requiring relatively high data throughput rates, and the radio transceiver chains 533a-533N convey MIMO signals the help obtain relatively high data throughput rates. In one configuration of this sixth alternative embodiment, the Baseband subsystem 502 is reconfigured to synthesize the MIMO signals as at least some of the N digital Baseband signals 55a1 & 55a2 and 55N1 & 55N2, upon exercising the assignment based on the second criterion.

In a seventh alternative embodiment of the Dynamic Assignment embodiment, there is a wireless Base Station (BS) system 100b, operative to assign dynamically a plurality of radio transceiver chains 533a-533N among a varying number of wireless channels 555a-555N. In this system, at least one of the antennas 577a-577N connected to the N radio transceiver chains 533a-533N is an omni-directional antenna, and any wireless channel 555a-555N propagated by an omni-directional channel can span substantially a 360 degree coverage area around the wireless BS, regardless of an assignment of radio transceiver chains 533a-533N among the wireless channels 555a-555N.

Figure 15A:
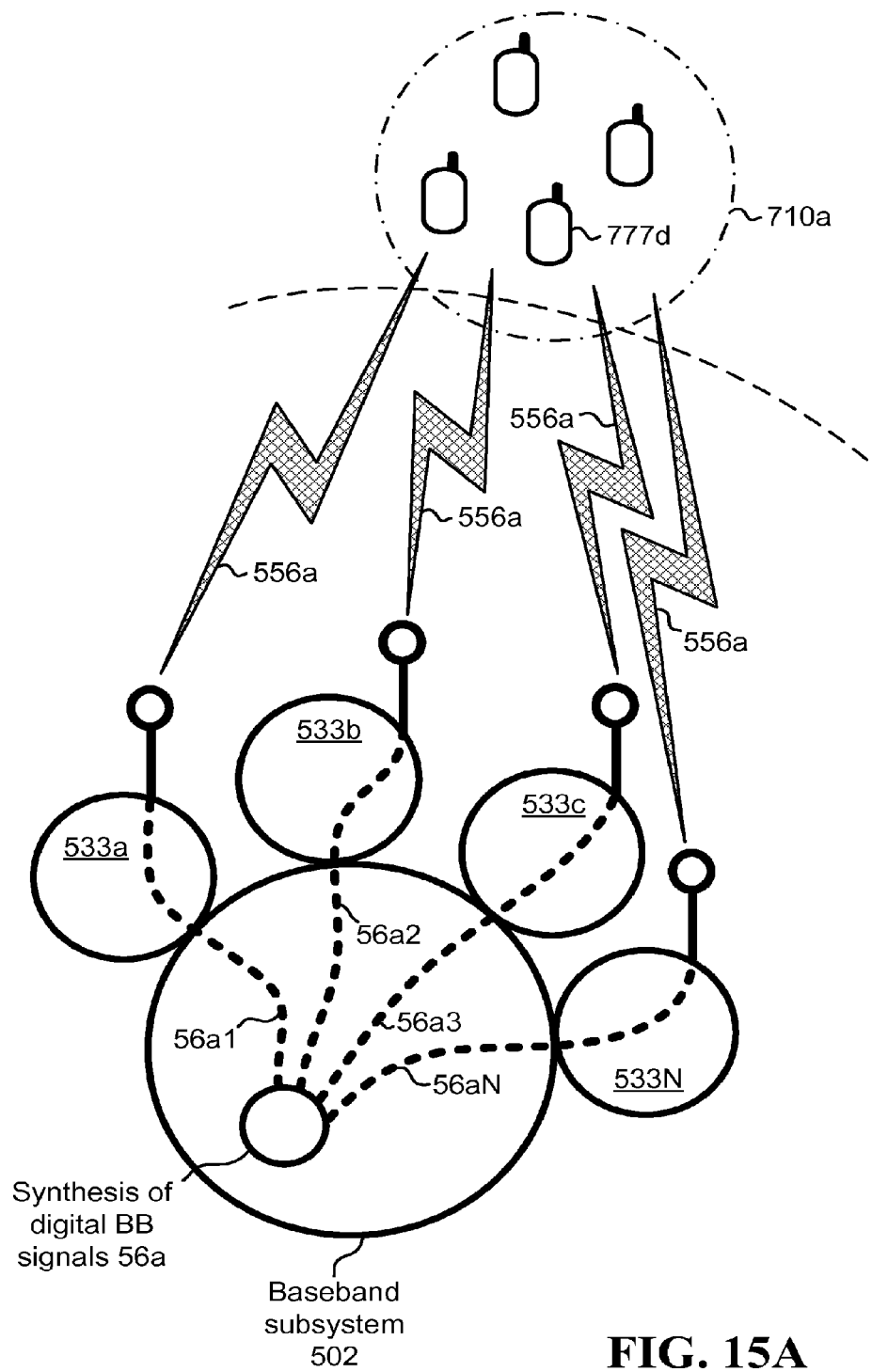
FIG. 15A illustrates one embodiment of components comprising a system for assigning dynamically a plurality of transceiver chains among a varying number of wireless channels, in which the system appears in a range-extension mode.

FIG. 15A illustrates one embodiment of a system state at a particular point of time. In FIG. 15A, there is a Baseband subsystem 502, which includes a Synthesis of Baseband signals 56a, which synthesizes N number of signals 56a1, 56a2, 56a3, through 56aN, sent to N number of radio transceiver chains 533a-533N. These signals are then conveyed by the radio transceiver chains over a single wireless channel 556a associated with a particular frequency range 710a. FIG. 15A shows an initial state, or in other words an initial phase, of an operation, during which there is communication with a group of wireless Subscriber Stations 777d located relatively distantly from the radio transceiver chains 533a-533N. The system state in FIG. 15A is a two-way system, as are all the system FIGS. 10A, 10C, and 11. The uplink path from 777d to 502 conveys signals in an order opposite from that of the downlink path. This initial state or initial phase of system operation is illustrated in FIG. 15A may be called a "range extension mode".

Figure 15B:
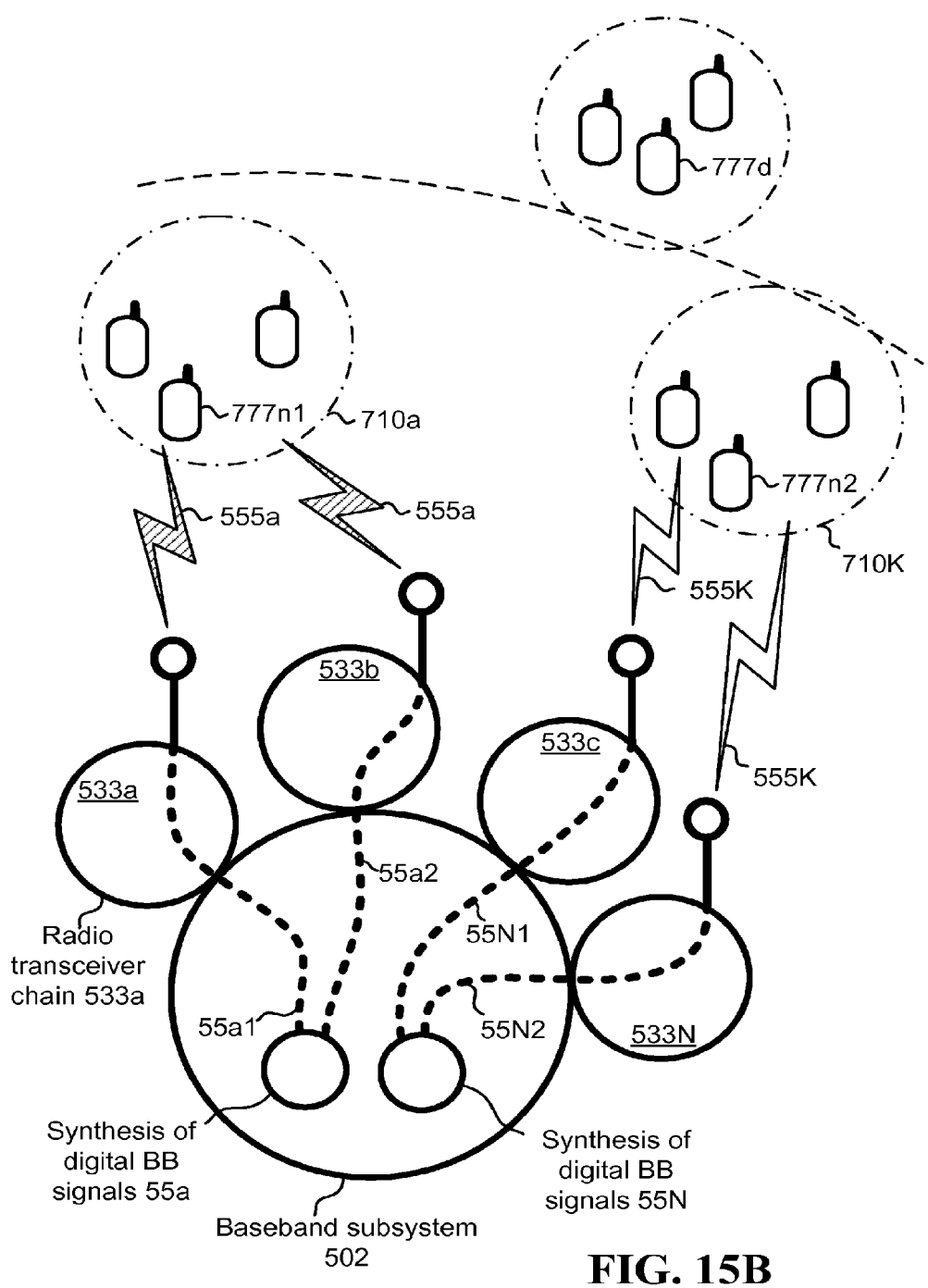
FIG. 15B illustrates one embodiment of components comprising a system for assigning dynamically a plurality of transceiver chains among a varying number of wireless channels, in which the system appears in an enhanced-capacity mode.

FIG. 15B illustrates one embodiment of a system state at a point of time that is different from the point of time illustrated in FIG. 15A. In 15B, there is a Baseband subsystem 502, which includes a Synthesis of digital Baseband signals 55a and 55N, which synthesizes N number of signals 55a1 & 55a2 associated with 55a and 55N1 & 55N2 associated with 55N, sent to N number of radio transceiver chains 533a-533N. These signals are then conveyed by the radio transceiver chains over K number of wireless channels 555a and 555K, associated with particular frequency ranges, 710a and 710K, respectively. FIG. 15B, shows a later state, or in other words a later phase, of an operation, during which there is communication with K groups of wireless Subscriber Stations, 777n1 using frequency range 710a, and 777n2 using frequency range 710K, respectively. These two groups are located relatively nearby to the radio transceiver chains 533a-533N. The system state in FIG. 15B is a two-way system, as are all the system FIGS. 10A, 10C, and 11. The uplink paths from 777n1 to 502 and from 777n2 to 502, convey signals in an order opposite from that of the downlink paths. The subsequent state or subsequent phase illustrated in FIG. 15B may be called an "enhanced capacity mode".

There is a transition in time from FIG. 15A to FIG. 15B. Initially, the system can achieve long-range communication for a relatively few number of Subscriber Stations. In the range extension mode, the system does not discriminate against nearby Subscriber Stations, so that there is communication with both relatively distant and relatively nearby Subscriber Stations, but one feature of the system is that it can communicate with relatively distant Subscriber Stations. In a subsequent stage called the enhanced capacity mode, system utilization has increased, the system communicates with more Subscriber Stations, but these Subscriber Stations are located relatively nearby to the radio transceiver chains. Greater capacity is achieved in the enhanced capacity mode by increasing the number of wireless channels, and hence decreasing the number of signals on each channel, all without increasing hardware or system resources. Greater capacity is achieved by eliminating or at least inhibiting communication between the radio transceiver chains and relatively distant Subscriber Stations. Switching between range extension mode and enhanced capacity mode is dynamic, and may change relatively rapidly in accordance with available system resources and relative Subscriber Station demand at any particular point in time.

Figure 16:
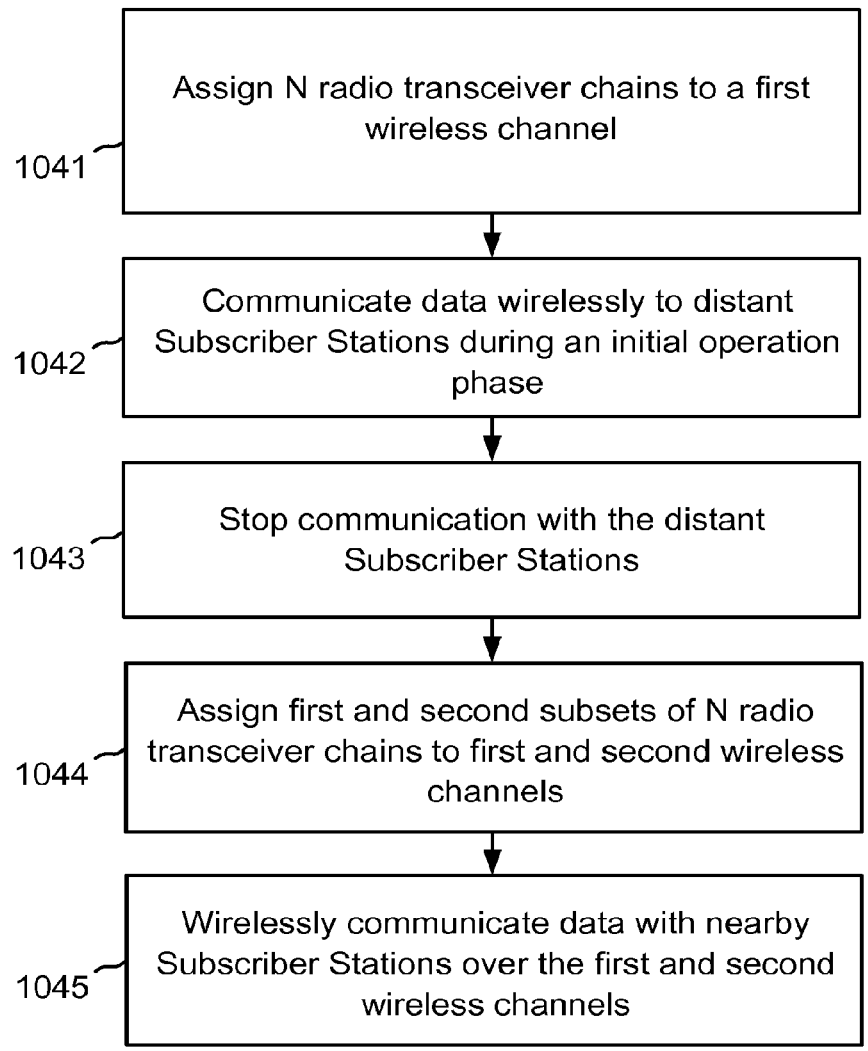
FIG. 16 illustrates one embodiment of elements of a method for transitioning from a range extension mode to an enhanced capacity mode in a wireless Base Station.

FIG. 16 illustrates a flow diagram describing one method for transitioning from a range extension mode to an enhanced capacity mode in a wireless Base Station 100b. In step 1041, a wireless Base Station 100b assigning N radio transceiver chains 533a-533N to a first wireless channel 556a associated with a first frequency range 710a. In step 1042, the wireless Base Station 100b communicating data wirelessly during an initial operation phase, with distant Subscribed Stations 777d, over the first wireless channel 556a, via the N radio transceiver chains 533a-533N, thereby utilizing the aggregated transmission power and the aggregated reception capability of the N radio transceiver chains 533a-533N to reach the distant Subscriber Stations 777d. In step 1043, the wireless Base Station 100b stopping communication with the distant Subscriber Stations 777d at the end of the initial operation phase. In step 1044, the wireless Base Station 100b assigning a first subset 533a & 533b of the N radio transceiver chains to a first wireless channel 555a associated with a the first frequency range 710a, and a second subset 533c & 533N of the N radio transceiver chains to a second wireless channel 555K associated with a second frequency range 710K. In step 1045, the wireless Base Station 100b wirelessly communicating data with nearby Subscriber Stations 777n1 & 777n2, over the first 555a and second 555K wireless channels, respectively, via the first subset 553a & 555b and second subset 555c & 555K of the N radio transceiver chains, respectively, thereby utilizing the aggregated spectrum of the first and second frequency ranges to enhance data capability of the wireless Base Station.

An alternative embodiment of the method immediately described further includes using an N-level coherent-phase transmission scheme over the N radio transceiver chains 533a-533N to communicate data wirelessly via the first wireless channel 555a during the initial operation phrase.

A particular configuration of the alternative embodiment of the method described above includes using an N-level combining-algorithm such as Phased-array coherent reception, MRC, MMSE and ML, in order to utilise the aggregated reception capability of the N radio transceiver chains 533a-533N during the initial operation phase.

In a further refinement of the particular configuration of the alternative embodiment of the method described above, further including, when the initial operation phase has ended, stopping use of the N-level coherent-phase transmission scheme and the N-level combining-algorithm, and starting use of MIMO transmission and reception schemes for at least one of the first 555a and second 555K wireless channels.

Figure 17:
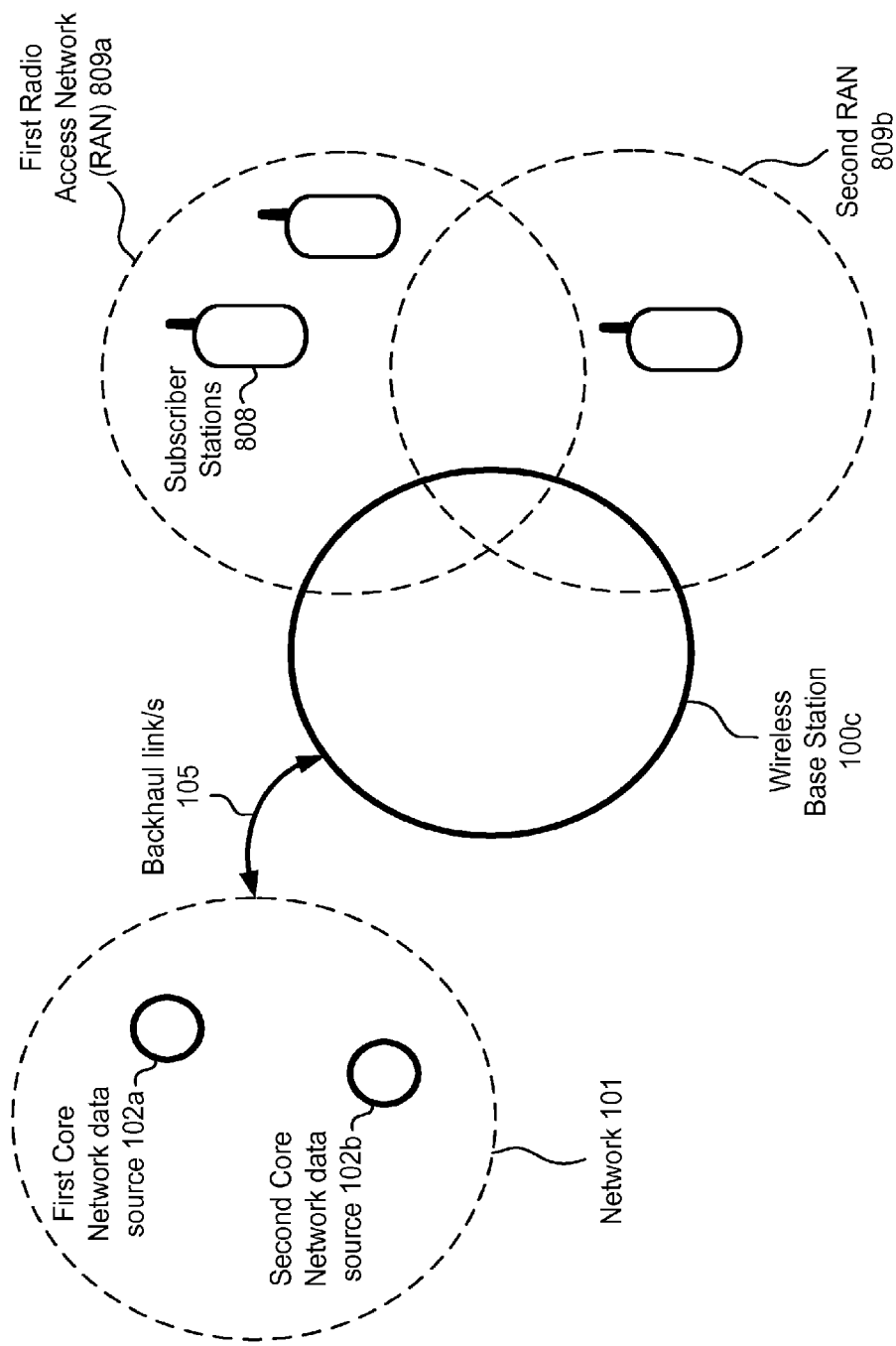
FIG. 17 illustrates one embodiment of components comprising a system for direct communication between multiple Core Networks and a wireless Base Station (BS), and between the wireless BS and multiple Radio Access Networks (RANs)

FIG. 17 illustrates one embodiment of components comprising a system for direct communication between multiple Core Networks and a wireless Base Station (BS), and between the wireless BS and multiple Radio Access Networks (RANs). Wireless Base Station (BS) 100c communicates over a backhaul link 105 and network 101 with a plurality of data sources, including at least a First Core Network data source 102a and a Second Core Network data source 102b. The wireless BS 100c also generates a First Radio Access Network 809a, which includes wireless Subscriber Stations 808, and a Second RAN 809b.

Figure 18A:
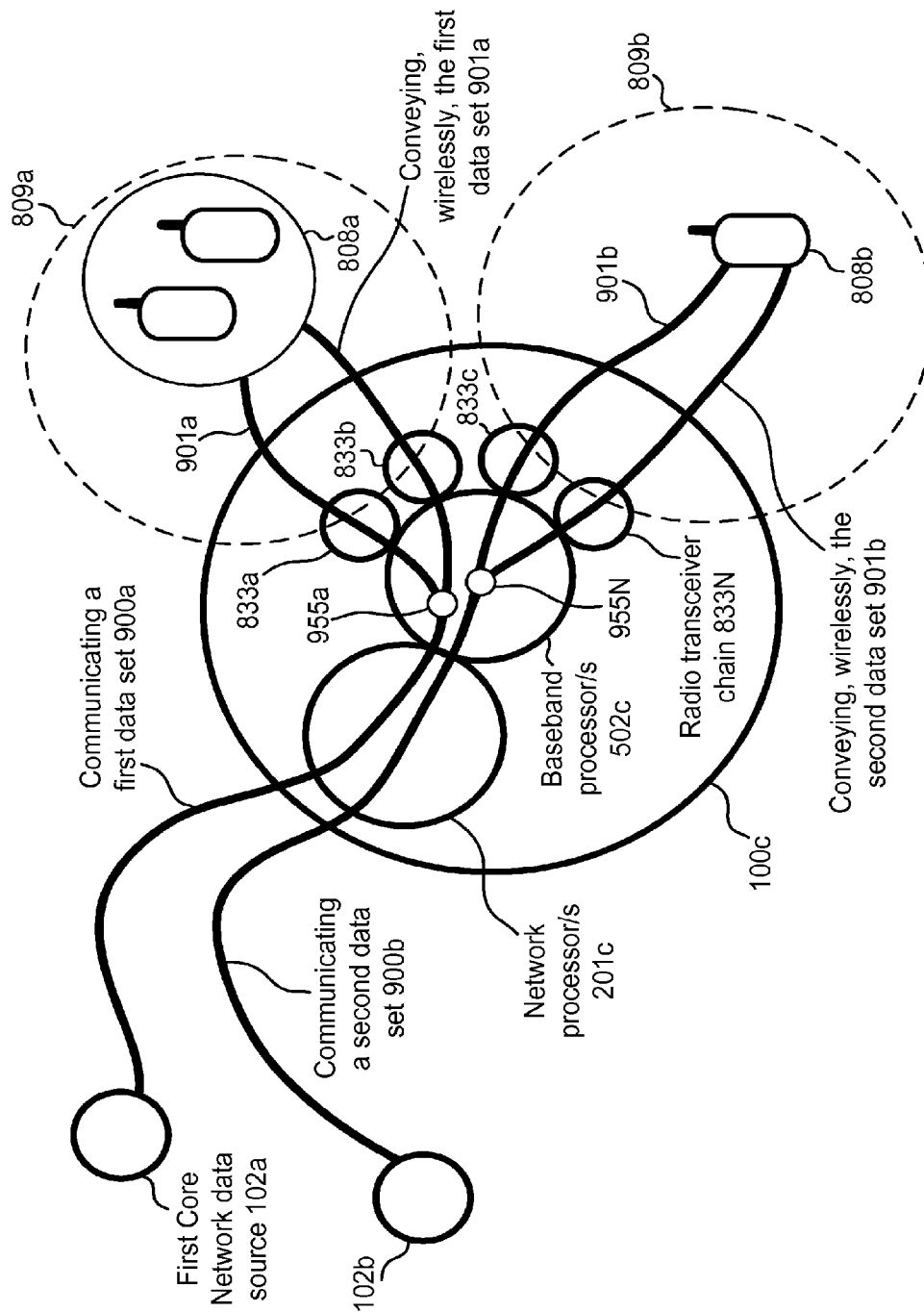
FIG. 18A illustrates one embodiment of components of a system with the potential to dynamically allocate a pool of at least three radio transceiver chains between first and second RANs.

FIG. 18A illustrates one embodiment of a point in time during which two radio transceiver chains have been allocated over one channel to a first RAN, and two other radio transceiver chains have been allocated over a second channel to a second RAN. Wireless Base Station 100c includes one or more network processors 201c, one or more Baseband Processors 502c, and three or more radio transceiver chains 833a, 833b, 833c, and 833N. A First Core Network data source 102a communicates a first data set 900a to the wireless Base Station 100c, which is then processed by the network processor 201c and the Baseband Processor 502c. A Second Core Network data source 102b communicates a second data set 900b to the wireless Base Station 100c, which is then processed by the network process 201c and the Baseband Processor 502c. The Baseband Processor 502c includes a plurality of syntheses of signals, here a first synthesis of signals 955a and a second synthesis of signals 955N. Each synthesis of signals will generate one or multiple signals to be conveyed over one or more radio transceiver networks to a RAN. At the point of time illustrated in FIG. 18A, synthesis 955a creates two signals which wirelessly convey the first data set 901a using each of two radio transceiver chains 833a and 833b, over a first RAN 809a, to a group of Subscriber Stations 808a. Substantially simultaneously, 955N creates two signals that wirelessly convey the second data set 901b using each of two radio transceiver chains 833c and 833N, over a second RAN 809b, to a group of Subscriber Stations 808b.

Figure 18B:
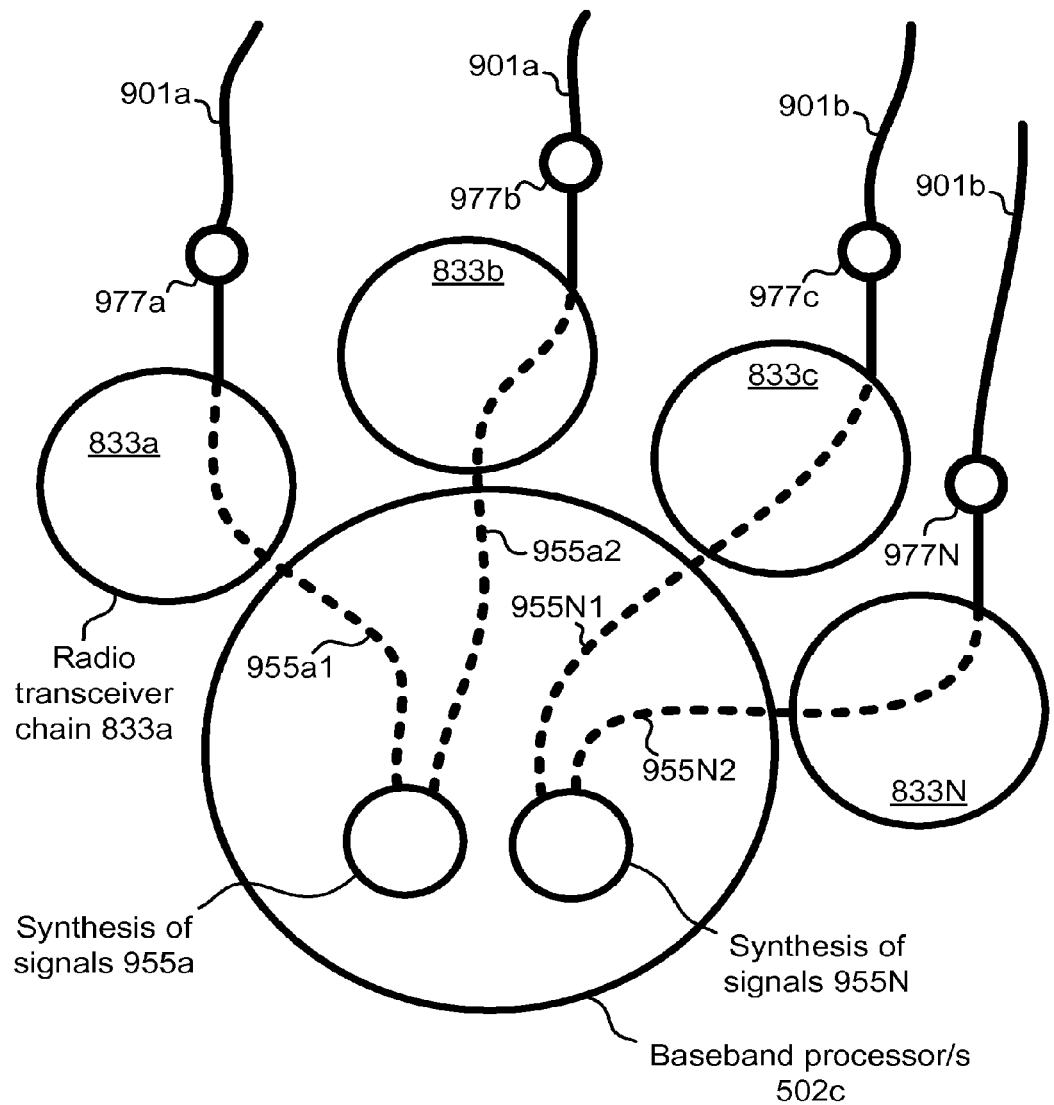
FIG. 18B illustrates one embodiment of a Baseband Processor which has allocated two signals to one wireless channel and two other signals to a second wireless channel.

FIG. 18B presents one embodiment of a Baseband Processor 502c and the associated radio transceiver chains. In FIG. 18B, synthesis of signals 955a creates two signals. One signal, signal 955a1, is conveyed to a radio transceiver chain 833a, then to an antenna 977a, then wirelessly conveying a first data set 901a to a first RAN. A second signal created by 955a is signal 955a2, which is conveyed to a radio transceiver chain 833b, then to an antenna 977b, then wirelessly conveying the first data set 901a to a first RAN. Substantially simultaneously, synthesis of signals 955N creates two signals. One signal, signal 955N1, is conveyed to a radio transceiver chain 833c, then to an antenna 977c, then wirelessly conveying a second data set 901b to a second RAN. A second signal created by 955N is signal 955N2, which is conveyed to a radio transceiver chain 833N, then to an antenna 977N, then wirelessly conveying the second data set 901b to a second RAN.

For FIGS. 18A and 18B, it may be appreciated that there must be at least a plurality of RANs, but there may be two RANs or any other number higher than two. FIGS. 18A and 18B illustrate an embodiment in which there are four radio transceiver chains, but there may be three such chains, four chains, or any number higher than four, provided that each of a plurality of RANs has at least one radio transceiver chain, and at least one of said plurality of RANs has two or more radio transceiver chains at a particular moment in time.

Figure 19A:
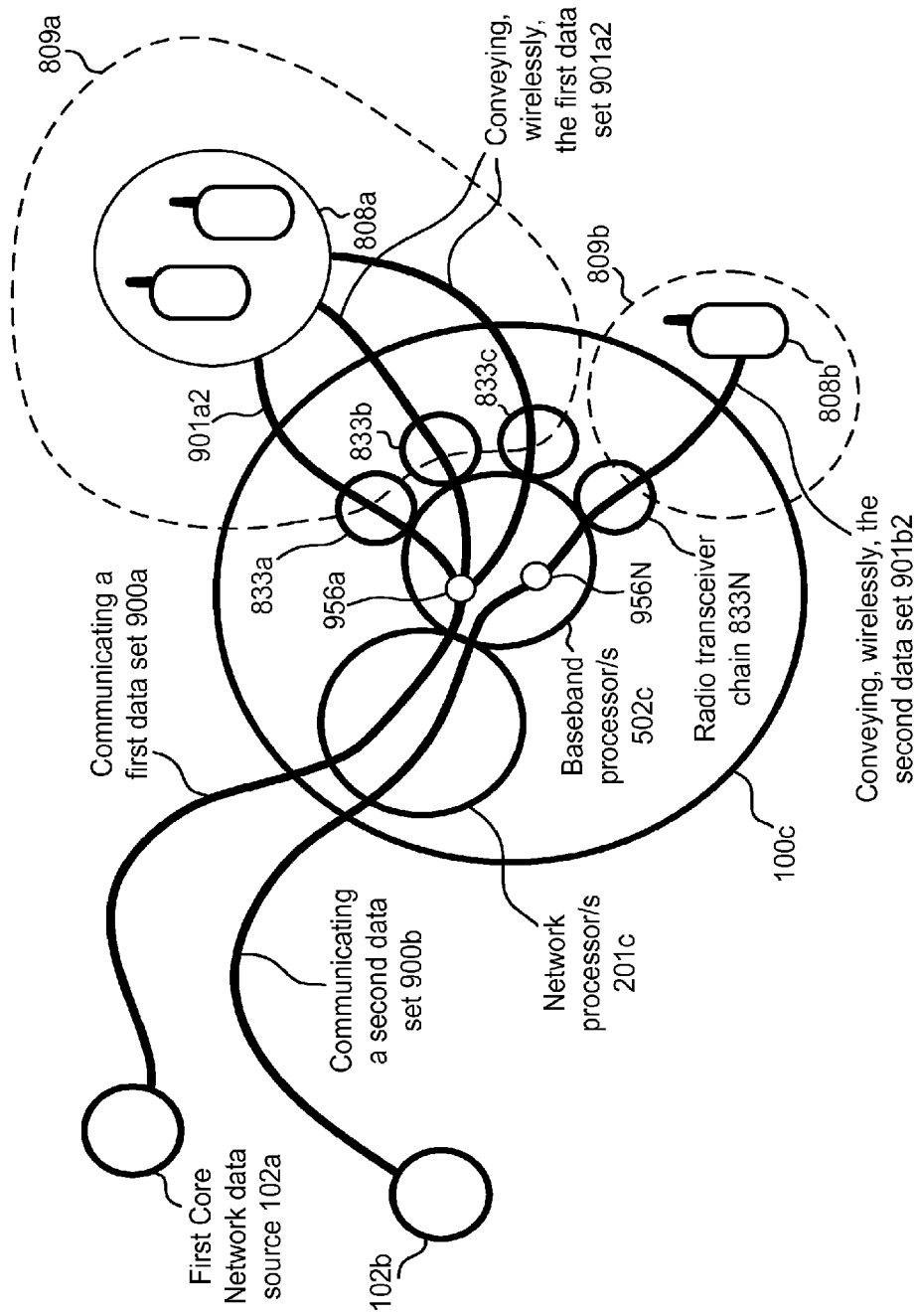
FIG. 19A illustrates one embodiment of components of a system in which a pool of at least three radio transceiver chains has been dynamically reallocated between first and second RANs.

FIG. 19A illustrates one embodiment of a point in time during which three radio transceiver chains have been allocated over one channel to a first RAN, and one other radio transceiver chain has been allocated over a second channel to a second RAN. Wireless Base Station 100c includes one or more network processors 201c, one or more Baseband Processors 502c, and three or more radio transceiver chains 833a, 833b, 833c, and 833N. A First Core Network data source 102a communicates a first data set 900a to the wireless Base Station 100c. A Second Core Network data source 102b communicates a second data set 900b to the wireless Base Station 100c. The Baseband Processor 502c includes a plurality of syntheses of signals, here a first synthesis of signals 956a and a second synthesis of signals 956N. Each synthesis of signals will generate one or multiple signals to be conveyed over one more radio transceiver networks to a RAN. At the point of time illustrated in FIG. 19A, synthesis 956a creates three signals which wirelessly convey the first data set 901a2 using each of three radio transceiver chains 833a, 833b, and 833c, over a first RAN 809a, to a group of Subscriber Stations 808a. Substantially simultaneously, 956N creates one signal that wirelessly conveys the second data set 901b2 using one radio transceiver chain 833N, over a second RAN 809b, to a group of Subscriber Stations 808b.

Figure 19B:
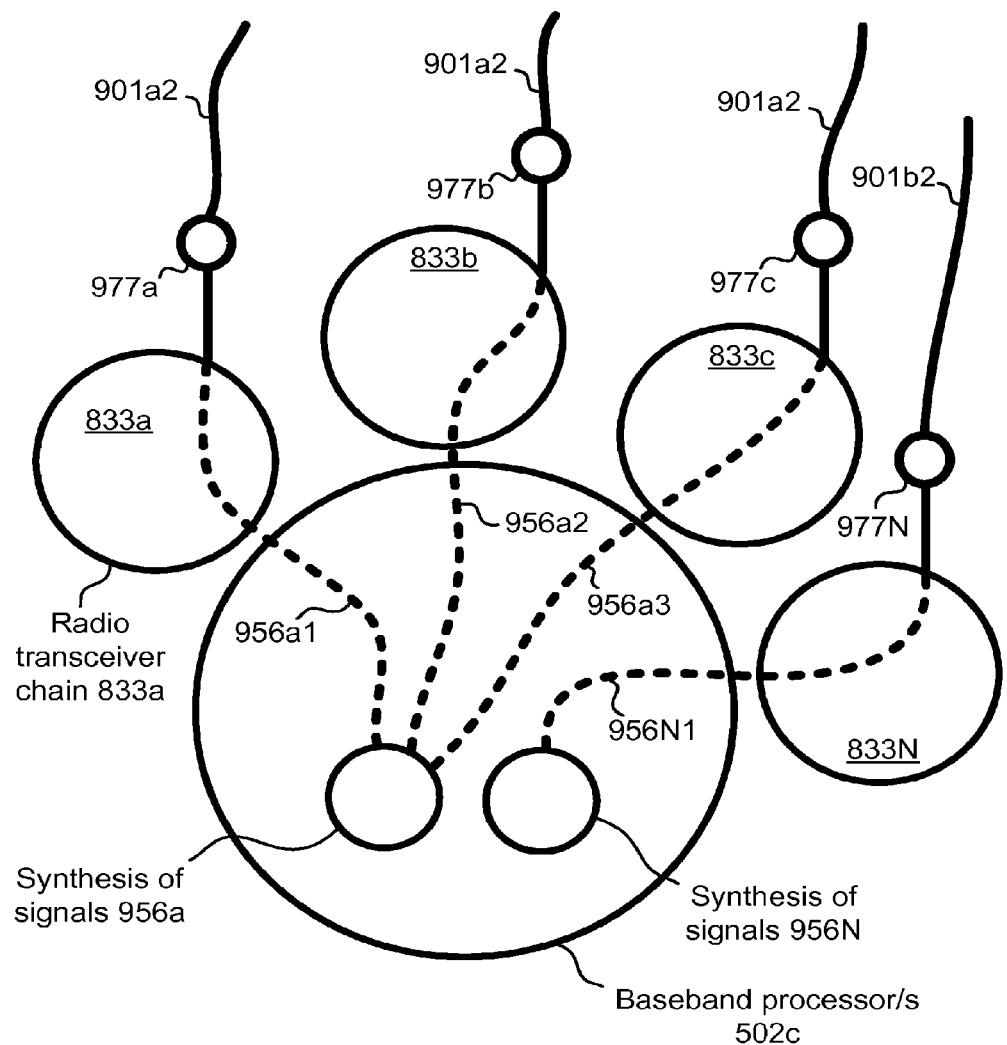
FIG. 19B illustrates one embodiment of a Baseband processor which has allocated three signals to one wireless channel and one other signals to a second wireless channel.

FIG. 19B presents one embodiment of a Baseband Processor 502c and the associated radio transceiver chains. In FIG. 19B, synthesis of signals 956a creates three signals. One signal, signal 956a1, is conveyed to a radio transceiver chain 833a, then to an antenna 977a, then wirelessly conveying a first data set 901a2 over a first RAN. A second signal created by 956a is signal 956a2, which is conveyed to a radio transceiver chain 833b, then to an antenna 977b, then wirelessly conveying the first data set 901a2 over the first RAN. A third signal created by 956a is signal 956a3, which is conveyed to a radio transceiver chain 833c, then to an antenna 977c, then wirelessly conveying the first data set 9901a2 over the first RAN. Substantially simultaneously, synthesis of signals 956N creates one signal, signal 956N1, which is conveyed to a radio transceiver chain 833N, then to an antenna 977N, then wirelessly conveying a second data set 901b2 over a second RAN.

For FIGS. 19A and 19B, it may be appreciated that there must be at least a plurality of RANs, but there may be two RANs or any other number higher than two. FIGS. 19A and 19B illustrate an embodiment in which there are four radio transceiver chains, but there may be three such chains, four chains, or any number higher than four, provided that each of a plurality of RANs has at least one radio transceiver chain, and at least one of said plurality of RANs has two or more radio transceiver chains at a particular moment in time.

FIGS. 18A and 18B illustrate one embodiment of a system at a particular point in time. FIGS. 19A and 19B illustrate one embodiment of the same system at a different point of time. In the first point in time, four radio transceiver chains have been allocated, two chains to each of two RANs. In the second point of time, four radio transceiver chains have been allocated, three chains to a first RAN and one chain to a second RAN.

It may be appreciated that there must be at least three radio transceiver chains in all embodiments. The reason is that all embodiments include (1) at least two operating RANs, and all embodiments include (2) an ability to re-allocate at least one RAN from one Operator to another Operator. As to (1), A radio transceiver chain is part of the infrastructure that creates the RAN, so that a RAN can exist only if at least one radio transceiver chain is allocated to it. Since all embodiments include at least two RANs, and each RAN must have at least one radio transceiver chain, hence every embodiment will include at least two radio transceiver chains to create the at least two RANs. As to (2), all embodiments have the potential to switch at least one radio transceiver chain from one Operator to another Operator, hence every embodiment will include at least three radio transceiver chains. Indeed, FIGS. 18A and 18B show a configuration at one point in time, while FIGS. 19A and 19B show the same system at a different point of time in which one of the radio transceiver chains, 833c, has been re-allocated from the second RAN to the first RAN.

In one embodiment, a wireless Base Station (BS) 100c system is operative to communicate directly with multiple Core Network data sources 102a & 102b on one side and directly provided multiple corresponding Radio Access Networks (RANs) 809a and 809b on the other side. Such a system may include a network processor 201c operative to communicate with a first and a second Core Network data sources 102a and 102b, at least one Baseband Processor 502c operative to create first and second RANs 809a & 809b substantially simultaneously, and a pool of at least three radio transceiver chains 833a, 833b, 833c, and 833N operative to accommodate the at least one Baseband Processor 502c in creating the first and second RANs 809a and 809b substantially simultaneously. Such a system may allocate dynamically the pool of the at least three radio transceiver chains 833a, 833b, 833c, and 833N, between the first and second RANs 809a and 809b according to a criterion, reconfigure the at least one Baseband Processor 502c to maintain the first and second RANs 809a and 809b according to the recent allocation, and operate the first and second RANs 809a and 809b using data communicated with the first and second Core Network data sources 102a and 102b, respectively.

In one alternative embodiment of such a system, the criterion may be based on dynamic data rate requirements of at least one of the Core Network data sources 102a and 102b, such that when the dynamic data rate requirements of the first Core Network data source 102a exceed the dynamic data rate requirements of the second Core Network data source 102b, more radio transceiver chains of those available in the system 833a, 833b, 833c, and 833N, are allocated to the first RAN 809a as compared to the second RAN 809b. In one configuration of this alternative embodiment, at least one of the radio transceiver chains 833a, 833b, 833c, and 833N that have been allocated to at least one of the RANs 809a and 809b convey Multiple Input Multiple Output (MIMO) signals 955a1 and 955a2.

In a second alternative embodiment of the wireless Base Station (BS) 100c system operative to directly communicate with multiple Core Network data sources 102a & 102b on one side and directly provided multiple corresponding Radio Access Networks (RANs) 809a and 809b on the other side, the criterion is based on measuring data rates over at least one of the RANs 809a and 809b, such that more of the radio transceiver chains 833a, 833b, 833c, and 833N, are allocated to the first RAN 809a as compared to the second RAN 809b, as a result of measuring higher data rates over the first RAN 809a as compared to the second RAN 809b. In one configuration of this alternative embodiment, at least one of the radio transceiver chains 833a, 833b, 833c, and 833N, allocated to at least one of the RANs 809a and 809b convey Multiple Input Multiple Output (MIMO) signals.

In a third alternative embodiment of the wireless Base Station (BS) 100c system operative to directly communicate with multiple Core Network data sources 102a & 02b on one side and directly provided multiple corresponding Radio Access Networks (RANs) 809a and 809b on the other side, the criterion is based on system gain requirements of the RANs 809a and 809b, such that when the first RAN 809a requires a higher system gain than the system gain required by the second RAN 809b, more radio transceiver chains are allocated to the first RAN 809a than to the second RAN 109b.

In one configuration of this alternative embodiment, the radio transceiver chains allocated to at least one of the RANs convey signals belonging to a wireless communication scheme selected from a group consisting of Phased-array coherent communication, Maximal Ratio Combining (MRC), Minimum Mean Square Error (MMSE) and Maximum Likelihood (ML).

In a fourth alternative embodiment of the wireless Base Station (BS) 100c system operative to directly communicate with multiple Core Network data sources 102a & 102b on one side and directly provided multiple corresponding Radio Access Networks (RANs) 809a and 809b on the other side, reconfiguring the at least one Baseband Processor to maintain the first and second RANs 809a and 809b according to the recent allocation, further includes performing first and a second signal syntheses 955a and 955N, or 956a and 956N, by the at least one Baseband Processor, in which the first synthesis is associated with the first RAN 809a and the second synthesis is associated with the second RAN 809b, and in which each sign synthesis creates at least one baseband signal, one of 955a1, 955a2, 955N1, or 955N2 in FIG. 18B, or one of 956a1, 956a2, 956a3, or 956aN in FIG. 19B, according to the allocation of radio transceiver chains among the RANs 809a and 809b.

There are at least two alternative configurations to the fourth alternative embodiment just described. In one alternative configuration, the first signal synthesis 955a or 956a synthesizes at least two baseband signals, and the at least two baseband signals belong to a wireless communication scheme selected from a group consisting of Phased-array coherent communication, Maximal Ratio Combining (MRC), Minimum Mean Square Error (MMSE) and Maximum Likelihood (ML).

In a second alternative configuration to the fourth alternative embodiment just described, at least the first signal synthesis 955a or 956a synthesizes at least two baseband signals, and these at least two baseband signals are Multiple Input Multiple Output (MIMO) signals.

Figure 20:
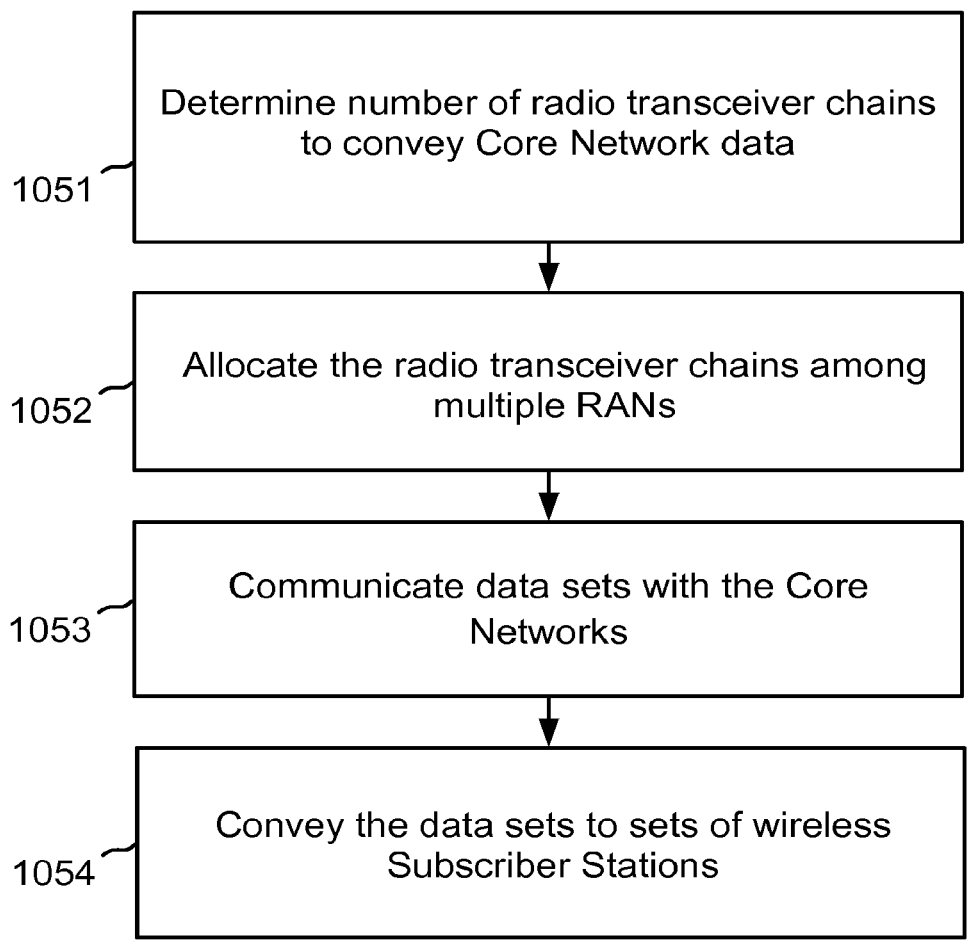
FIG. 20 illustrates one embodiment of the elements of a method for dynamically generating a plurality of Radio Access Networks (RANs) by a single wireless Base Station (BS)

FIG. 20 is a flow diagram illustrating one method for dynamically generating a plurality of Radio Access Networks (RANs) 809a & 809b by a single wireless Base Station (BS) 100c. In step 1051, determining dynamically a first number of radio transceiver chains and a second number of radio transceiver chains needed by a wireless BS 100c to convey wirelessly data communicated with a first corresponding Core Network data source 102a and a second corresponding Core Network data source 102b. In step 1052, allocating the first and the second numbers of radio transceiver chains, out of a pool of radio transceiver chains 833a-833N belonging to the wireless BS 100c, to a first RAN 809a and a second RAN 809b of the wireless BS 100c, respectively. In step 1053, communicating, by the wireless BS 100c, a first and a second data sets with the first Core Network 102a and the second Core Network 102b data sources respectively. In step 1054, conveying wirelessly, by the wireless BS 100c, to a first set 808a and a second set 808b of wireless Subscriber Stations (SS), the first and the second data sets, over the first and the second RANs respectively.

An alternative embodiment of the method just described, further comprising determining from time to time the first and second numbers of radio transceiver chains needed by the wireless BS 100c to convey wirelessly the first and second data sets, and allocating from time to time the first and second numbers of radio transceiver chains.

One possible configuration of the alternative embodiment just described is such alternative embodiment, further comprising determining the first and the second number of radio transceiver chains according to first and second data rate associated with communicating the first and second data sets, respectively. One possible permutation of this configuration further comprises measuring the first and second data rates. A second possible permutation of this configuration further comprises querying the first 102a and second 102b Core Network data sources for the first and second data rates, respectively.

A second possible configuration of the alternative embodiment just described is said alternative embodiment, wherein at some point in time most of the pool of radio transceiver chains is allocated to the first RAN. One possible permutation of this configuration is the configuration wherein in at some point in time most of the pool of radio transceiver chains is allocated to the second RAN.

A third possible configuration of the alternative embodiment just described is such alternative embodiment, further comprising determining the first and second numbers of radio transceiver chains according to a first distance of Subscriber Stations (SS) from the wireless BS 100c, and a second distance of Subscriber Stations from the wireless BS, respectively.

A second alternative embodiment to the method described is said method, further comprising communicating the first and second data sets with the first 102a and second 102b Core Network data sources using at least one Backhaul link 105.

One possible configuration of this second alternative embodiment is said second alternative embodiment, wherein the at least one Backhaul link 105 comprises a first network Tunnel connecting the first Core Network data source 102a with the wireless BS 100c, and a second network Tunnel connecting the second Core Network data source 102b with the wireless BS 100c. One possible permutation of this configuration of the second alternative embodiment is said second alternative embodiment, in which the wireless BS 100c is an integrated Pico-BS, having the network Tunnels directly connected to the first 102a and second 102b Core Network data sources, and the Pico-BS substantially does not require a dedicated infrastructure to facilitate connectivity with the Core Networks data sources 102a & 102b other than the at least one Backhaul link 105 and an network 101 comprising the Core Network data sources 102a & 102b.

A second possible configuration of the second alternative embodiment is the second alternative embodiment, in which the first data set is communicated over the first Backhaul link and the second data set is communicated over a second Backhaul link.

A third alternative embodiment to the method described is said method, in which the first Core Network data source 102a belongs to a first Operator, the second Core Network data source 102b belongs a second Operator, the first RAN 809a is associated with an identity of the first Operator, and the second RAN 809b is associated with the identity of the second Operator.

Figure 21:
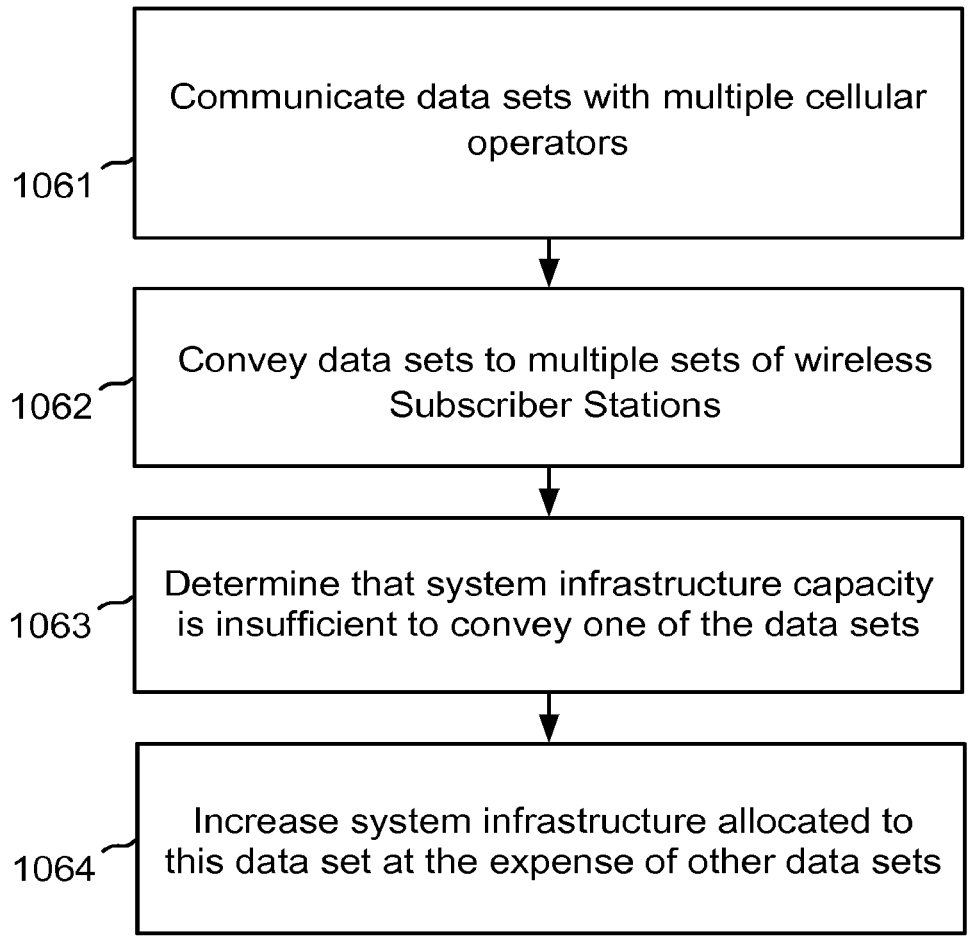
FIG. 21 illustrates one embodiment of the elements of a method for servicing multiple Operators via a single wireless Base Station (BS) utilizing dynamic allocation of radio transceiver chains.

FIG. 21 is a flow diagram illustrating one method for servicing multiple Operators via a single wireless Base Station (BS) 100c, utilizing dynamic allocation of radio transceiver chains. In step 1061, a wireless BS 100c communicating first and second data sets 900a & 900b with a first Core Network data source 102a belonging to a first Operator and with a second Core Network data source 102b belonging to a second Operator, respectively. In step 1062, the wireless BS 100c conveying wirelessly, to a first set and a second set of wireless Subscriber Stations (SS) 808a & 808b, the first and the second data sets, respectively, over a first and a second RAN, respectively 809a & 809b, utilizing a first set 833a & 833b and a second set 833c & 833N of radio transceiver chains, respectively. In Step 1063, determining that the first set of radio transceiver chains is not sufficient to convey the first data set. In Step 1064, increasing the number of radio transceiver chains in the first set, at the expense of the second set, thereby making the first set better suited to convey the first data set.

One alternative embodiment to the method just described is the method, in which increasing the number of radio transceiver chains in the first set further comprises determining the number of radio transceiver chains that can be reduced from the second set of radio transceiver chains without substantially impairing the ability of the second set of radio transceiver chains to convey the second data set, reducing the number of radio transceiver chains from the second set of radio transceiver chains and adding the number of radio transceiver chains to the first set of radio transceiver chains.

A second alternative embodiment to the method for servicing multiple Operators via a single wireless Base Station utilizing dynamic allocation of radio transceiver chains, is such method in which the number of radio transceiver chain in the first set further comprises determining a number of radio transceiver chains to be reduced from the second set of radio transceiver chains and to be added to the first set of radio transceiver chains such that the number of radio transceiver chains is operative to substantially equate the ability of the first set of radio transceiver chains to convey the first data set with the ability of the second set of radio transceiver chains to convey the second data set, reducing the number of radio transceiver chains from the second set of radio transceiver chains, and adding the number of radio transceiver chains to the first set of radio transceiver chains.

In this Detailed Description, numerous specific details are set forth. However, the embodiments of the invention may be practiced without some of these specific details. In other instances, well-known hardware, software, materials, structures and techniques have not been shown in detail in order not to obscure the understanding of this description. In this description, references to "one embodiment" mean that the feature being referred to may be included in at least one embodiment of the invention. Moreover, separate references to "one embodiment" or "some embodiments" in this description do not necessarily refer to the same embodiment.

Illustrated embodiments are not mutually exclusive, unless so stated and except as will be readily apparent to those of ordinary skill in the art. Thus, the invention may include any variety of combinations and/or integrations of the features of the embodiments described herein. Although some embodiments may depict serial operations, the embodiments may perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. The embodiments are not limited in their applications to the details of the order or sequence of steps of operation of methods, or to details of implementation of devices, set in the description, drawings, or examples. Moreover, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments. Accordingly, unless specifically indicated herein, the order and grouping of the steps is not a limitation of the embodiments. Furthermore, methods and mechanisms of the embodiments will sometimes be described in singular form for clarity. However, some embodiments may include multiple iterations of a method or multiple instantiations of a mechanism unless noted otherwise. For example, when an interface is disclosed in an embodiment, the scope of the embodiment is intended to cover also the use of multiple interfaces. Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination. Embodiments described in conjunction with specific examples are presented by way of example, and not limitation. Moreover, it is evident that many alternatives, modifications and variations will be apparent to those skilled in the art. It is to be understood that other embodiments may be utilised and structural changes may be made without departing from the scope of the embodiments. Accordingly, it is intended to embrace all such alternatives, modifications and variations that fall within the spirit and scope of the appended claims and their equivalents.

What is claimed is:

1. A method for dynamically generating a plurality of Radio Access Networks (RAN) by a single wireless base station (BS), comprising:
   determining dynamically first and second amounts of wireless access spectrum needed by a wireless BS to wirelessly convey data from first and second corresponding core network data sources;
   allocating the determined first and second amounts of wireless access spectrum to first and second RANs of the wireless BS, respectively; and
   communicating, by the wireless BS, first and second data sets with said first and second core network data sources, respectively.

2. The method of claim 1 further comprising conveying, by the wireless BS, to first and second sets of wireless Subscriber Stations (SS), said first and second data sets, over said first and the second RANs, respectively.

3. A system for dynamically generating a plurality of Radio Access Networks (RAN) by a single wireless Base Station (BS), wherein said system
   determines dynamically first and second amounts of wireless access spectrum needed by the wireless BS to wirelessly convey data from first and second corresponding core network data sources; and
   allocates the determined first and second amounts of wireless access spectrum to first and second RANs of the wireless BS, respectively;
   further wherein said wireless BS
   communicates first and second data sets with the first and second core network data sources, respectively; and
   conveys, to first and second sets of wireless subscriber stations (SS), the first and second data sets, over the first and second RANs, respectively.

* * * * *